United States Patent [19]

Nagasawa et al.

[11] Patent Number: 4,991,309

[45] Date of Patent: Feb. 12, 1991

[54] FINE POSITIONING DEVICE AND DISPLACEMENT CONTROLLER THEREFOR

[75] Inventors: Kiyoshi Nagasawa, Ibaragi; Kozo Ono, Toride; Kojiro Ogata, Ishioka; Ken Murayama, Chiyoda; Yoshihiro Hoshino, Tsuchiura, all of Japan

[73] Assignee: Hitachi Construction Machinery Co., Ltd., Tokyo, Japan

[21] Appl. No.: 244,101

[22] Filed: Sep. 14, 1988

Related U.S. Application Data

[62] Division of Ser. No. 94,294, Sep. 8, 1987, abandoned.

[30] Foreign Application Priority Data

| Sep. 9, 1986 | [JP] | Japan | 61-210616 |
| Sep. 9, 1986 | [JP] | Japan | 61-210618 |
| Sep. 9, 1986 | [JP] | Japan | 61-210619 |
| Nov. 4, 1986 | [JP] | Japan | 61-262437 |
| Nov. 29, 1986 | [JP] | Japan | 61-283061 |
| Nov. 29, 1986 | [JP] | Japan | 61-283062 |
| Nov. 29, 1986 | [JP] | Japan | 61-283063 |
| Mar. 31, 1987 | [JP] | Japan | 62-76269 |
| Mar. 31, 1987 | [JP] | Japan | 62-76270 |

[51] Int. Cl.$^5$ .................. B23Q 16/00; G01B 5/00
[52] U.S. Cl. ........................... 33/568; 33/573; 33/1 M; 318/646
[58] Field of Search ............... 33/573, 568, 569, 1 M; 310/311, 323, 328; 350/531; 318/638, 640, 646, 648, 687, 560

[56] References Cited

U.S. PATENT DOCUMENTS

| 4,559,717 | 12/1985 | Scire et al. | 33/568 |
| 4,667,415 | 5/1987 | Barsky | 33/568 |
| 4,686,440 | 8/1987 | Hatamura et al. | 318/646 |

FOREIGN PATENT DOCUMENTS 0074601  5/1982  Japan ........................ 33/573

Primary Examiner—Thomas B. Will
Attorney, Agent, or Firm—Oblon, Spivak, McClelland, Maier & Neustadt

[57] ABSTRACT

A fine positioning device is formed of a rigid support member; a first set of radial flexible-beam displacement mechanisms provided symmetrically to each other on the support member to produce angular displacements about a first axis; a second set of radial flexible-beam displacement mechanisms provided symmetrically to each other on the support member to produce angular displacements about a second axis which is perpendicular to the first axis; a third set of radial flexible-beam displacement mechanisms connected to either one of the sets of radial flexible-beam displacement mechanisms to produce angular diaplacements about a third axis which is perpendicular to both the first and second axes; and a fine motion table fixed on the radial flexible-beam displacement mechanisms which are other than those connected to the radial flexible-beam displacement mechanisms for producing angular displacements about the third axis.

6 Claims, 22 Drawing Sheets

FINE POSITIONING DEVICE AND DISPLACEMENT CONTROLLER THEREFOR

This is a division of application Ser. No. 07/094,294, filed Sept. 8, 1987, now abandoned.

BACKGROUND OF THE INVENTION (1) Field of the Invention

This invention relates to a fine positioning device suitable for use in an apparatus which requires fine adjustment on the order of micrometers, such as semiconductor fabrication apparatus or electron microscope, and also to a displacement controller for such a fine positioning device.

(2) Description of the Prior Art

In various fields of technology, there has recently been a strong demand for devices which enable fine adjustment of displacements on the $\mu$m order. As a typical technical field, may be mentioned semiconductor fabrication apparatus employed in the fabrication processes of LSI (large-scale integrated circuits) and super large-scale integrated circuits, such as mask aligners, electron-beam drawing machines and the like. In these apparatus, it is necessary to achieve fine positioning of the $\mu$m order. The degree of integration increases and products of higher performance can be fabricated, as the positioning accuracy is improved. Such fine positioning is required not only for the above-described semiconductor fabrication apparatus but also for a variety of high-magnification optical apparatus, led by electron microscopes, and the like. Improved accuracy contributes significantly to the development of advanced technology such as biotechnology, space development, etc.

As such fine positioning devices, a variety of devices have heretofore been proposed, for example as shown in a Japanese magazine, "Kikai Sekkei (Machine Designing)", 27(1), 32–36, January 1983. Of such fine positioning devices, those making use of parallel springs and fine motion actuators are considered to be superb in that inter alia, they do not require cumbersome displacement reducing mechanisms and their structures are simple. Accordingly, a fine positioning device of the above sort will hereinafter be described with reference to FIG. 1.

FIG. 1 is a side view of a conventional fine positioning device, in which there are illustrated a support table 1, planar parallel springs 2a,2b fixed in parallel to each other on the support table 1, and a fine motion table 3 supported on the parallel spring 2a,2b and having a high degree of rigidity. Designated at numeral 4 is a fine motion actuator mounted between the support table 1 and fine motion table 3. The fine motion actuator 4 makes use of a piezoelectric element, electromagnetic solenoid or the like, which is energized to apply a force to the fine motion table 3 along the x-axis of the coordinate system depicted in the figure.

The parallel springs 2a,2b, reflecting their structure, have low rigidity in the direction of the x-axis but high rigidity in the direction of the z-axis and in the direction of the y-axis (namely, in the direction perpendicular to the drawing sheet). When the fine motion actuator 4 is energized, the fine motion table 3 thus undergoes a displacement practically along the x-axis only and no substantial displacements take place in the other directions.

FIG. 2 is a perspective view of another conventional fine positioning device which is readily conceivable from the devices disclosed by way of example in the above-mentioned magazine. In the figure, there are shown a support plate 6, a pair of planar parallel springs 7a,7b fixed in parallel to each other on the support table 6, a middle table 8 fixed on the parallel springs 7a,7b and having a high degree of rigidity, another pair of parallel springs 9a,9b fixed on the middle table 8 and extending in parallel to each other in a direction perpendicular to the parallel spring 7a,7b, and a fine motion table 10 fixed on the parallel spring 9a,9b and having a high degree of rigidity. When a coordinate system is established as shown in the figure, the parallel spring 7a,7b are arranged along the x-axis, while the parallel springs 9a,9b are disposed along the y-axis. This structure corresponds basically to a structure obtained by stacking two structures, each of the same type as the one-axis (displaceable along the x-axis only) structure depicted in FIG. 1, one over the other. An arrow $F_x$ indicates a force to be applied along the x-axis to the fine motion table 10, while an arrow $F_y$ designates a force to be applied along the y-axis to the middle table 8. Unillustrated actuators which can apply the forces $F_x,F_y$ are provided respectively between the support table 6 and fine motion table 10 and between the support table 6 and the middle table 8.

When the force $F_x$ is applied to the fine motion table 10, the parallel springs 9a,9b are deformed. Since the parallel springs 7a,7b have high rigidity against the force $F_x$ applied along the x-axis, the fine motion table 10 is allowed to undergo a displacement practically along the x-axis only. When the force $F_y$ is exerted to the middle table 8 on the other hand, the parallel springs 7a,7b are deformed and by way of the parallel springs 9a,9b, the fine motion table 10 is displaced practically along the y-axis only. When both forces $F_x,F_y$ are applied at the same time, the parallel springs 7a,7b,9a,9b are simultaneously deformed. Correspondingly, the fine motion table 10 is displaced two-dimensionally.

As described above, the device shown in FIG. 2 can perform positioning along two axes whereas the device illustrated in FIG. 1 is a one-axis positioning device.

In each of the devices shown respectively in FIGS. 1 and 2, the fine motion table 10 is displaced linearly along the specific axis. On the other hand, Japanese Patent Publication No. 50433/1982 discloses a fine positioning device in which a fine motion table is caused to undergo a fine angular displacement about a specific axis. This fine positioning device will next be described with reference to FIG. 3.

FIG. 3 is a partially cut-away perspective view of a conventional fine positioning device which makes use of fine angular displacements. In the figure, numeral 11 indicates a fixed central portion in the form of a cylindrical column and numerals 11a,11b,11c designate vertical slots formed with an equal interval, along the length of the fixed central portion, in the circumferential wall of the fixed central portion 11. There are also depicted a ring-shaped stage 12 provided movably about the fixed central portion 11 and U-like metal members 12a$_1$-12a$_3$, 12b$_1$-12b$_3$,12c$_1$-12c$_3$ secured fixedly on the stage 12 in opposition to the vertical slots 11a,11b,11c respectively. Designated at numeral 13 are bimorph cells 5 mounted between the individual vertical slots 11a,11b, 11c and their corresponding U-like metal members 12a$_1$-12c$_3$, while numeral 13A indicates beads fixed on the bimorph cells 13 at locations where the bimorph cells 13 engage their corresponding U-like metal members 12a$_1$-12c$_3$. The fixed central portion 11, stage 12 and individual U-like metal members $12a_1$-$12c_3$ are all rigid. Here, the above-mentioned bimorph cells 13 are described in brief with reference to FIG. 4.

FIG. 4 is a perspective view of one of the bimorph cells $12a_1$-$12c_3$. In the figure, there are shown piezoelectric elements $13a,13b$ and a common electrode $13c$ provided between the piezoelectric elements $13a,13b$. The piezoelectric elements $13a,13b$ are rigidly cemented together with the common electrode $13c$ interposed therebetween. Designated at numerals $13d,13e$ are surface electrodes applied fixedly to the piezoelectric elements $13a,13b$ respectively. In the above stacked or double-layered structure, when a voltage of such a polarity that the piezoelectric element $13a$ is caused to contract is applied between the surface electrode $13d$ and common electrode $13c$ and at the same time, another voltage of such a polarity that the piezoelectric element $13b$ is caused to expand is applied between the surface electrode $13e$ and common electrode $13c$, the piezoelectric elements $13a,13b$ are respectively caused to contract and expand in the directions shown by arrows. As a result, the bimorph cell 13 is deformed as a whole as shown in the figure. Owing to this property, the bimorph cell 13 can provide a greater degree of displacement compared with a single piezoelectric element.

In the device shown in FIG. 3, the bimorph cells 13 which have the above-described property are fixed at one ends thereof in their corresponding vertical slots $11a,11b,11c$ but the other ends of the bimorph cells 13 remain as free ends and are kept via their respective beads 13A in contact with the corresponding U-like metal members $12a_1$-$12c_3$. Let's now assume that suitable voltages are applied respectively to the bimorph cells 13 so as to cause them to undergo such deformations as shown in FIG. 4. Corresponding to the deformations of the bimorph cells 13, the stage 12 undergoes an angular displacement about the fixed central portion 11. If a fine motion table is fixedly mounted on the stage 12, it is possible to have the fine motion table to undergo the angular displacement.

In the above-described conventional device the U-like metal members $12a_1$-$12c_3$ and their corresponding bimorph cells 13 are kept in mutual contact. Owing to this structural feature, the bimorph cells are mounted while being allowed to undergo free deformations. This structural feature can thus avoid the imminent restraint (interference) of displacements which takes place if the bimorph cells 13 should be fixed to the stage 12.

The fine positioning devices depicted in FIGS. 1 and 2 may be used only for one-dimensional and two-dimensional positioning respectively. They can produce neither displacement along the z-axis nor angular displacement about the x-, y- or z-axis. Turning to the fine positioning device shown in FIG. 3, it can produce neither displacement along the x-, y- or z-axis nor angular displacement about any one of the other two axes. From these conventional fine positioning devices, it may only be feasible to contemplate a 3-axis fine positioning device, which can produce displacements along both x-axis and y-axis and an angular displacement about the z-axis, by combining the device of FIG. 2 and that of FIG. 3 together. It is believed to be extremely difficult to construct a 4-axis or larger multi-axis fine positioning device on the basis of such conventional devices.

SUMMARY OF THE INVENTION

With the foregoing in view, the present invention has as its principal objects the solution of the problems of the above-described prior art and at the same time the provision of a fine positioning device which can produce with a simple and small structure displacements along and/or about at least two axes out of displacements along x-, y- and z-axes and those about x-, y- and z-axes, and also the provision of a displacement controller for controlling precisely each displacement of the fine positioning device.

In order to achieve the above objects, the present invention provides in a first aspect thereof a fine positioning device comprising:

a central rigid portion;

a first set of outwardly-extending portions extending symmetrically along a first axis from the central rigid portion;

a second set of outwardly-extending portions extending symmetrically from the central rigid portion along a second axis which is perpendicular to the first axis;

a first set of parallel flexible-beam displacement mechanisms provided symmetrically to each other with the first set of outwardly-extending portions respectively to produce translational displacements along the second axis; and a second set of parallel flexible-beam displacement mechanisms provided symmetrically to each other with the second set of outwardly-extending portions respectively to produce translational displacements along the first axis. The above fine positioning device can obtain translational displacements along each of two axes which are perpendicular to each other.

In a second aspect of this invention, there is also provided a fine positioning device comprising:

a rigid support member;

a first set of radial flexible-beam displacement mechanisms provided symmetrically to each other on the support member to produce angular displacements about a first axis;

a second set of radial flexible-beam displacement mechanisms provided symmetrically to each other on the support member to produce angular displacements about a second axis which is perpendicular to the first axis; and a third set of radial flexible-beam displacement mechanisms connected to either one of the sets of radial flexible-beam displacement mechanisms to produce angular displacements about a third axis which is perpendicular to both first and second axes. The above fine positioning device can obtain angular displacements about each of three axes which are perpendicular to one another.

In a third aspect of this invention, there is also provided a fine positioning device comprising:

a first block comprising a central rigid portion, a first set of outwardly-extending portions extending symmetrically along a first axis from the central rigid portion and equipped respectively with first parallel flexible-beam displacement mechanisms to produce in the first set of outwardly-extending portions translational displacements along a second axis which is perpendicular to the first axis, and a second set of outwardly-extending portions extending symmetrically along the second axis from the central rigid portion and equipped respectively with second parallel flexible-beam displacement mechanisms to produce in the second set of outwardly-extending portions translational displacements along the first axis;

a second block comprising a central rigid portion and a set of outwardly-extending portions extending symmetrically along the second axis from the central rigid portion, said outwardly-extending portions being equipped respectively with parallel flexible-beam displacement mechanisms adapted to produce translational displacement along a third axis, which is perpendicular to both first and second axes, and connected to the second set of outwardly-extending portions respectively; and a third block comprising a rigid ring, a set of first radial flexible-beam displacement mechanisms provided on the rigid ring and adapted to produce angular displacements about the first axis, a set of second radial flexible-beam displacement mechanisms provided on the rigid ring and adapted to produce angular displacements about the second axis, and a set of outwardly-extending portions extending symmetrically from a central rigid portion, which is connected to the central rigid portion of the second block, and equipped respectively with third radial flexible-beam displacement mechanisms for producing angular displacements about the third axis. The above fine positioning device can obtain both translational and angular displacements along and about each of three axes which are perpendicular to one another.

In a fourth aspect of this invention, there is also provided a fine positioning device comprising:

a central rigid portion;

a first set of outwardly-extending portions extending symmetrically along a first axis from the central rigid portion;

a second set of outwardly-extending portions extending symmetrically from the central rigid portion along a second axis which is perpendicular to the first axis;

a set of radial flexible-beam displacement mechanisms provided symmetrically to each other with the first set of outwardly-extending portions respectively and adapted to produce angular displacements about a third axis which is perpendicular to both first and second axes, and a set of parallel flexible-beam displacement mechanisms provided symmetrically to each other with the first set of outwardly-extending portions respectively and adapted to produce translational displacements along the second axis; and a set of parallel flexible-beam displacement mechanisms provided symmetrically to each other with the second set of outwardly-extending portions and adapted to produce translational displacements along the first axis. The above fine positioning device can obtain translational displacements along each of two axes extending perpendicularly to each other and angular displacements about a further axis extending at right angles to the two axes.

In a fifth embodiment of this invention, there are also provided a fine positioning device comprising:

a central rigid portion;

a first set of outwardly-extending portions extending symmetrically along a first axis from the central rigid portion;

a second set of outwardly-extending portions extending symmetrically from the central rigid portion along a second axis which is perpendicular to the first axis;

a set of radial flexible-beam displacement mechanisms provided symmetrically to each other with the first set of outwardly-extending portions respectively and adapted to produce angular displacements about a third axis which is perpendicular to both first and second axes, and a set of parallel flexible-beam displacement mechanisms provided symmetrically to each other with the first set of outwardly-extending portions respectively and adapted to produce translational displacements along the second axis;

a set of parallel flexible-beam displacement mechanisms provided symmetrically to each other with the second set of outwardly-extending portions and adapted to produce translational displacements along the first axis; and a set of parallel flexible-beam displacement mechanisms provided symmetrically to each other with the second set of outwardly-extending portions and adapted to produce translational displacements along the third axis. The above fine positioning device can obtain translational displacements along each of three axes extending perpendicularly to one another and angular displacements about one of these three axes.

In a sixth aspect of this invention, there is also provided a fine positioning device comprising:

a rigid support plate;

radial flexible-beam displacement mechanisms provided on the support plate and adapted to produce angular displacements about a first axis; and radial flexible-beam displacement mechanisms provided on the support plate and adapted to produce angular displacements about a second axis which is perpendicular to the first axis. The above fine positioning device can obtain angular displacements about each of two axes which are perpendicular to each other.

In a seventh aspect of this invention, there is also provided a fine positioning device comprising:

a central rigid portion;

a first set of outwardly-extending portions extending symmetrically along a first axis from the central rigid portion;

a second set of outwardly-extending portions extending symmetrically from the central rigid portion along a second axis which is perpendicular to the first axis;

a set of radial flexible-beam displacement mechanisms provided symmetrically to each other with the first set of outwardly-extending portions respectively and adapted to produce angular displacements about a third axis which is perpendicular to both first and second axes, and a set of parallel flexible-beam displacement mechanisms provided symmetrically to each other with the first set of outwardly-extending portions respectively and adapted to produce translational displacements along the second axis;

a set of parallel flexible-beam displacement mechanisms provided symmetrically to each other with the second set of outwardly-extending portions and adapted to produce translational displacements along the first axis, and a set of parallel flexible-beam displacement mechanisms provided symmetrically to each other with the second set of outwardly-extending portions and adapted to produce translational displacements along the third axis;

a rigid support plate;

radial flexible-beam displacement mechanisms provided on the support plate and adapted to produce angular displacements about the fist axis and radial flexible-beam displacement mechanisms provided on the support plate and adapted to produce angular displacements about the second axis; and connecting portions connecting rigid portions of one set of radial flexible-beam displacement mechanisms, out of both radial flexible beam displacement mechanisms provided on the support plate, to one ends of one set of outwardly-extending portions out of the first and second sets of outwardly-extending portions. The above fine positioning device can obtain translational displacements along each of three axes extending perpendicularly to one another and angular displacements about each of the three axes.

In an eighth aspect of this invention, there is also provided a displacement controller for a fine positioning device constructed of planar structural units connected symmetrically and equipped individually with planar flexible beams arranged in an opposing relation between two rigid members and actuators for applying forces between the rigid members, which comprises:

displacement detection means arranged at predetermined points on the respective planar structural units;

displacement setting means for setting a target displacement for the fine positioning device and outputting values corresponding to displacements of the respective planar structural units corresponding to the target displacement; and control means for controlling voltages to be applied to the respective actuators so that values obtained by the displacement detection means and representing the displacements of the respective planar structural units are coincided with the values output from the displacement setting means and relating to the corresponding displacements. The displacement controller can equalize the displacement of each planar structural unit in the symmetrical parallel flexible-beam displacement mechanism or the radial flexible-beam displacement mechanism. The displacement of the fine positioning device can be effected precisely by using the above controller for each of the symmetrical parallel flexible-beam displacement mechanism and radial flexible-beam displacement mechanism in the above fine positioning device.

In a ninth aspect of this invention, there is also provided a controller for a fine positioning device constructed of planar structural units connected symmetrically and equipped individually with planar flexible beams arranged in an opposing relation between two rigid members and actuators for applying forces between the rigid members, which comprises:

displacement detection means arranged at predetermined points on the respective planar structural units;

displacement setting means for setting a target displacement for the fine positioning device and outputting a value corresponding to the target displacement;

means for determining, by the displacement detection means a first degree of displacement based on a desired displacement form and a second degree of displacement based on a displacement form other than the desired displacement form; and control means for controlling voltages to be applied to the respective actuator in such a way that the first degree of displacement is coincided with the value output from the displacement setting means and the detection value of the second degree of displacement is controlled at "0". The above controller can eliminate angular displacements in the parallel flexible-beam displacement mechanism or translational displacements in the radial flexible-beam displacement mechanism. The displacement of the above fine positioning device can be effected precisely by using the above controller for each of the symmetrical parallel flexible-beam displacement mechanism and radial flexible beam displacement mechanism in the above fine positioning device.

In a tenth aspect of this invention, there is also provided a displacement controller for a fine positioning device constructed by combining a plurality of fine motion units which are individually equipped with planer flexible beams arranged in an opposing relation between two rigid members and an actuator for applying a force between the rigid members so as to produce a relative displacement corresponding to a drive voltage of the actuator between the rigid members, which comprises:

a target displacement setting unit for outputting a target displacement for each predetermined point on the fine positioning device; and a characteristic compensation computing unit having characteristics opposite to a characteristic matrix, which represents the relation between the drive voltage applied to each fine motion unit and the resulting displacement at the predetermined point, and adapted to compute a drive voltage for each fine motion unit in accordance with the opposite characteristics. The above displacement controller can avoid interference between the parallel flexible-beam displacement mechanism and radial flexible-beam displacement mechanism in the above fine positioning device.

As described above, the fine positioning device of this invention is constructed by providing one or more parallel flexible-beam displacement mechanisms and/or radial flexible-beam displacement mechanisms in a rigid member. The fine positioning device hence has a simple and small overall structure. Each parallel flexible-beam displacement mechanism or radial flexible-beam displacement mechanism can be provided with a displacement controller. Alternatively, a displacement controller can be provided for the entire fine positioning device. It is therefore possible to obtain a displacement of high accuracy.

BRIEF DESCRIPTION OF THE DRAWINGS

The above and other objects, features and advantages of this invention will become apparent from the following description and the appended claims, taken in conjunction with the accompanying drawings, in which:

DETAILED DESCRIPTION OF THE INVENTION AND PREFERRED EMBODIMENTS

Figure 5:
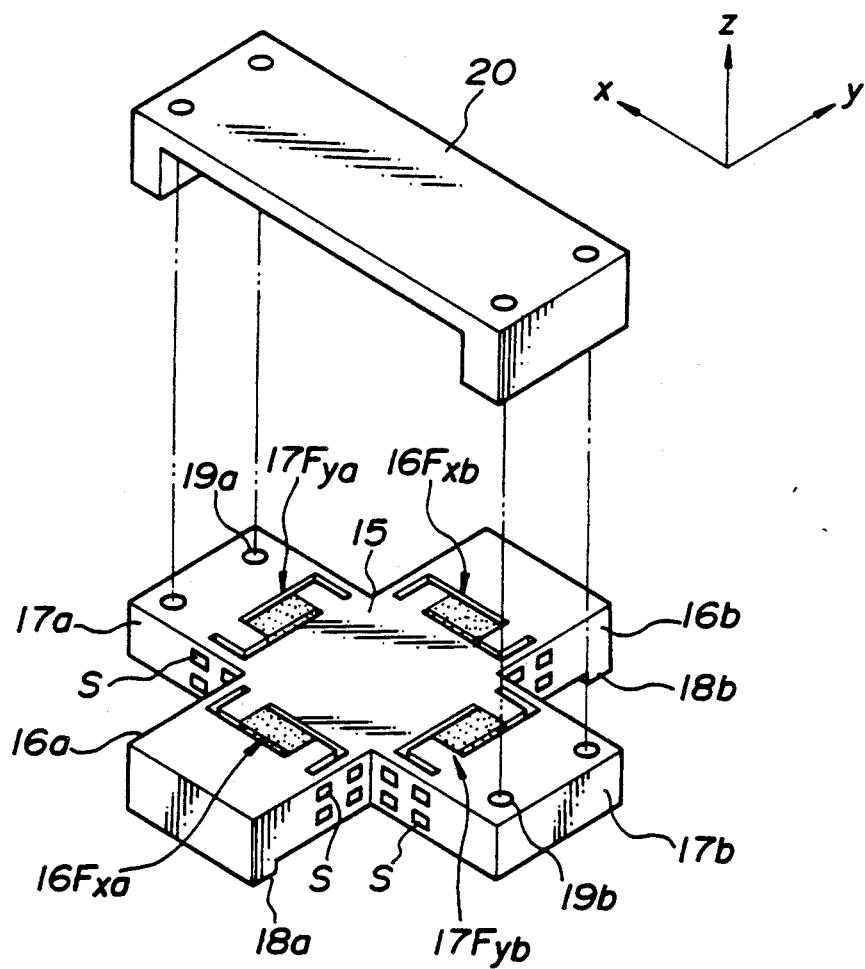
FIG. 5 is an exploded perspective view of a fine positioning device according to a first embodiment of this invention.

FIG. 5 is an exploded perspective view of a fine positioning device according to the first embodiment of this invention, in which there are shown coordinate axes x, y and z which are perpendicular to one another, a central rigid portion 15, an outwardly-extending portion 16a extending out along the y-axis from the central rigid portion 15, another outwardly-extending portion 16b extending out from the central rigid portion 15 in a direction opposite to the outwardly-extending portion 16a, a further outwardly-extending portion 17a extending out along the x-axis from the central rigid portion 15, and a still further outwardly-extending portion 17b extending out from the central rigid portion 15 in a direction opposite to the outwardly-extending portion 17a. There are also depicted fixed portions 18a,18b provided at lower end parts of the outwardly-extending portions 16a,16b, fine motion table connecting portions 19a,19b provided at upper end parts of the outwardly-extending portions 17a,17b, and a fine motion table 20.

The outwardly-extending portions 16a,16b,17a, 17b, fixed portions 18a,18b and fine motion table connecting portions 19a,19b are all formed of the same material as the central rigid portion 15 and are worked or machined out together with the central rigid portion 15 from a single block.

Designated at numerals $16F_{xa},16F_{xb}$ are parallel flexible-beam displacement mechanisms formed in the outwardly-expanding portions 16a,16b respectively. The parallel flexible-beam displacement mechanisms $16F_{xa}$, $16F_{xb}$ are formed symmetrically to each other relative to the central rigid portion 15. The parallel flexible-beam displacement mechanisms $16F_{xa},16F_{xb}$ cooperate to produce translational displacements along the x-axis. Designated at numerals $17F_{ya},17F_{yb}$ are parallel flexible-beam displacement mechanisms formed in the outwardly-expanding portions 17a,17b respectively. The parallel flexible-beam displacement mechanisms $17F_{ya}$, $17F_{yb}$ are formed symmetrically to each other relative to the central rigid portion 15. The parallel flexible-beam displacement mechanisms $17F_{ya},17F_{yb}$ cooperate to produce translational displacements along the y-axis. The structure of the parallel flexible-beam displacement mechanism will be described subsequently. The parallel flexible-beam displacement mechanisms $16F_{xa},16F_{xb},17F_{ya},17F_{yb}$ are formed by formed predetermined through-holes at desired locations in the respective outwardly-extending portions 16a,16b,17a, 17b. Letter S indicates strain gauges provided with each parallel flexible-beam displacement mechanism.

Figure 6A:
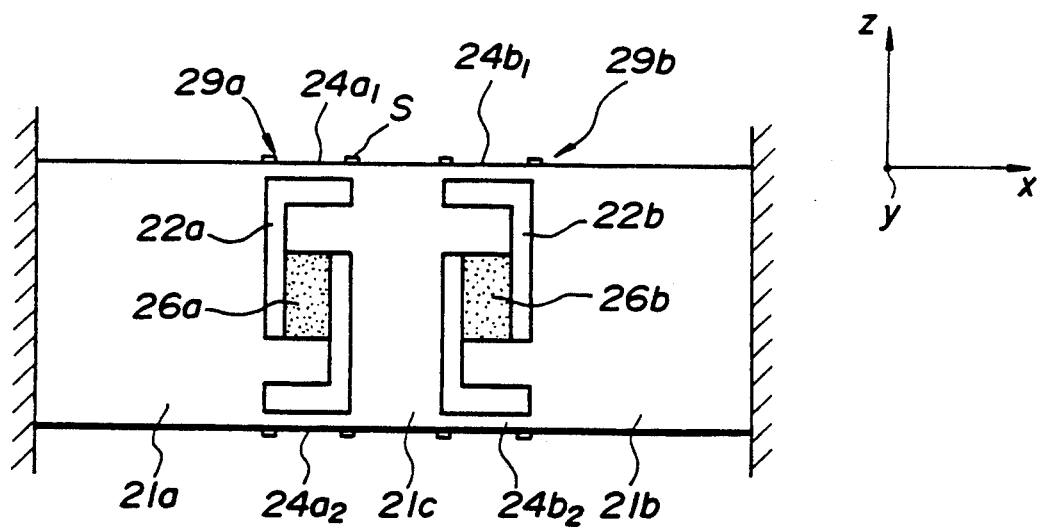
FIGS. 6A and 6B are side views of a symmetrical parallel flexible-beam displacement mechanism.
Figure 6B:
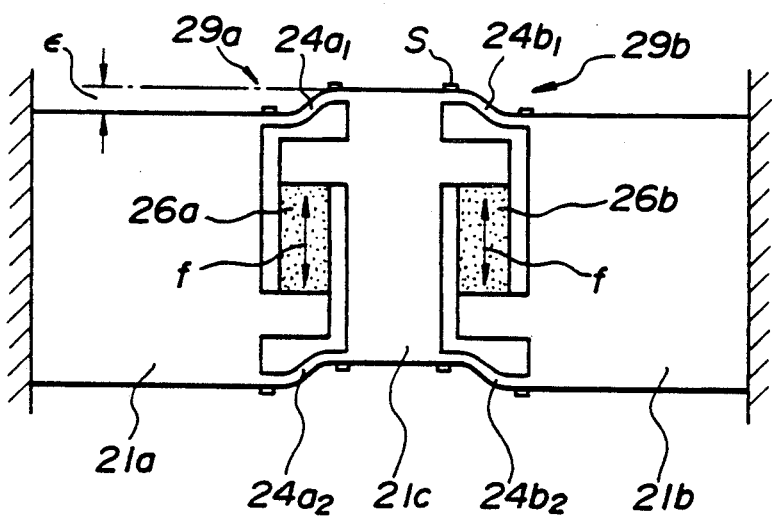

The structure of the above parallel flexible-beam displacement mechanisms will next be described with reference to drawings. FIGS. 6A and 6B are side views of a symmetrical parallel flexible-beam displacement mechanism. In each of these drawings numerals 21a,21b,21c indicate rigid portions while numerals $24a_1,24a_2$ designate parallel flexible beams connected in parallel to each other between the rigid portions 21c,21a. The parallel flexible beams $24a_1,24a_2$ are formed by a through hole 22a formed through the rigid portion. Designated at numerals $24b_1,24b_2$ designate parallel flexible beams connected in parallel to each other between the rigid portions 21b,21c. The parallel flexible beams $24a_1,24a_2$ are formed by a through hole 22b formed through the rigid portion. Numerals 26a, 26b indicate piezoelectric actuators, which are fit between tongues extending from the rigid portions into the respective through-holes 22a,22b. A parallel flexible-beam displacement mechanism 29a is constructed by the elements located on the left hand relative to the center line of the rigid portion 21c, while another parallel flexible-beam displacement mechanism 29b is by the elements located on the right hand relative to the center line of the rigid portion 21c. Similar to FIG. 5, Letter S indicates strain gauges provided at suitable locations on each parallel flexible beam.

Figure 1:
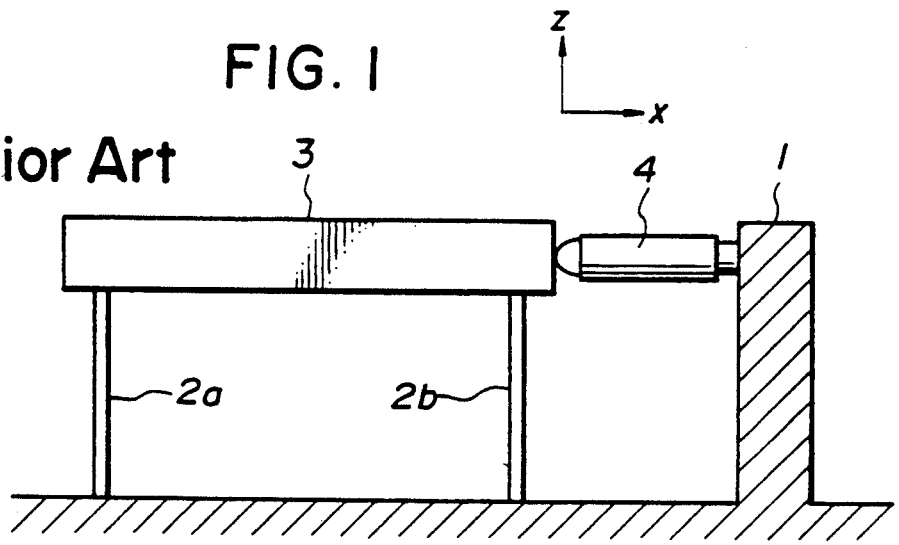
FIGS. 1, 2 and 3 are side view, perspective view and partly cut-away perspective view of conventional fine positioning devices respectively.
Figure 2:
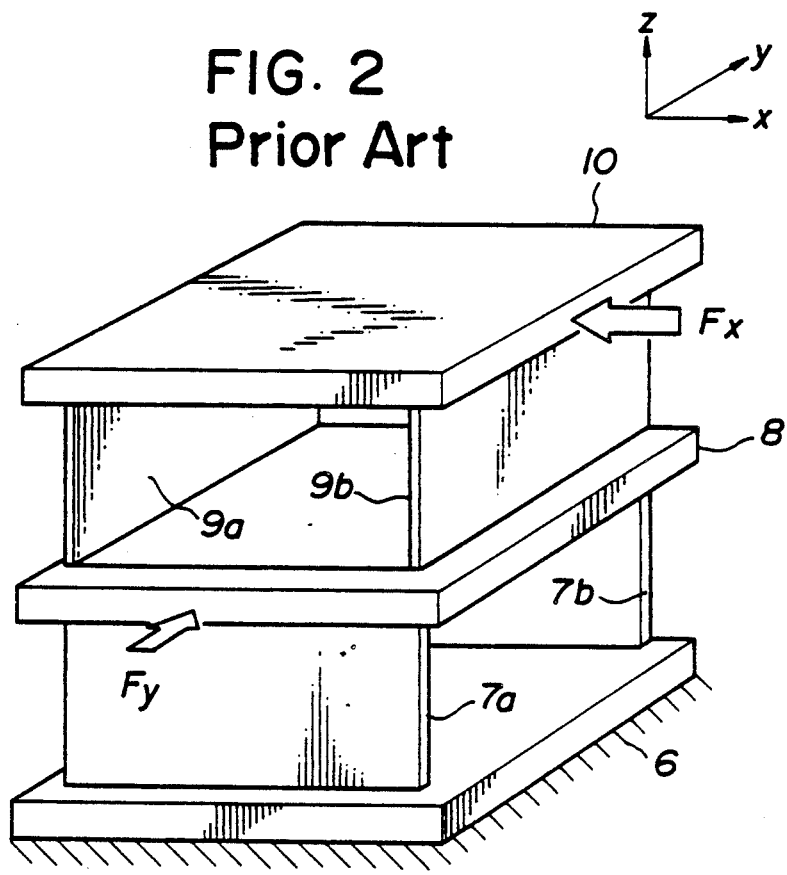
Figure 3:
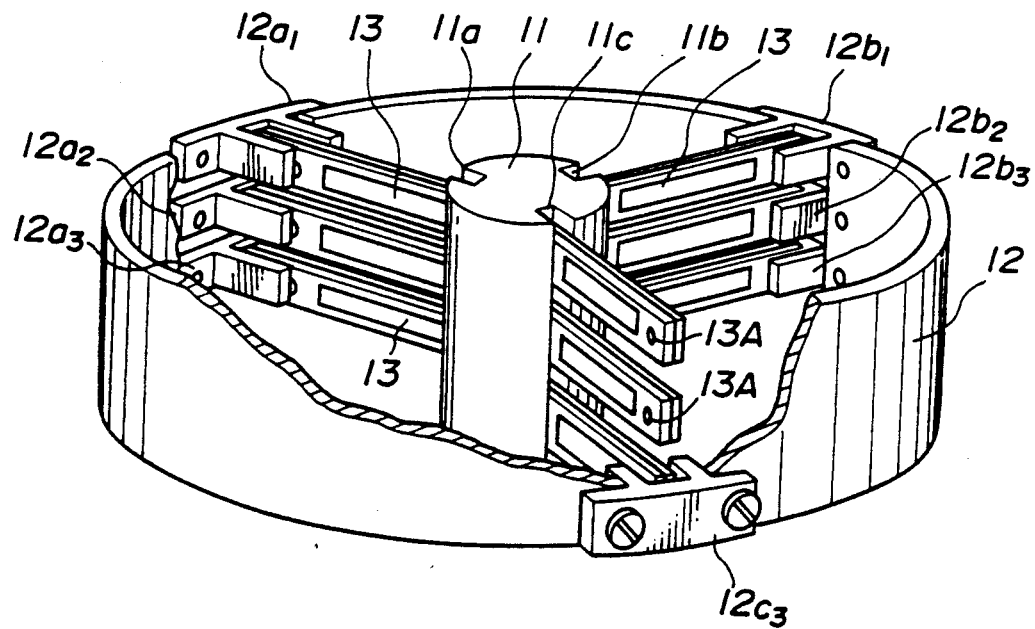
Figure 4:
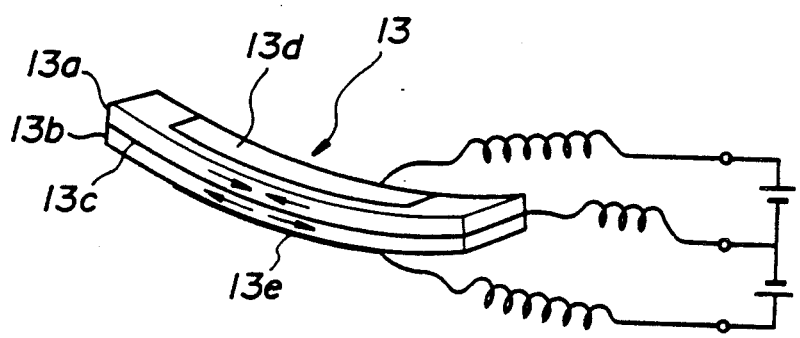
FIG. 4 is a perspective view of one of the bimorph cells employed in the device depicted in FIG. 3.

Let's now establish coordinate axes as shown in the drawings (the y-axis extends in a direction perpendicular to the drawing sheet). Voltages are now applied simultaneously to the piezoelectric actuators 26a,26b respectively so as to generate forces f of the same magnitude along the z-axis. Let's now investigate a displacement to be produced in one of the parallel flexible-beam displacement mechanisms, for example in the parallel flexible-beam displacement mechanism 29a. Upon application of the voltage to the piezoelectric actuator 26a, the rigid portion 21 is pressed by the force f along the z-axis. The parallel flexible-beam $24a_1,24a_2$ thus undergo a bending deformation like the parallel springs 2a,2b depicted in FIG. 1 so that the rigid portion 21c is displaced along the z-axis as illustrated in FIG. 6B. If the other parallel flexible-beam displacement 29b were not provided, a lateral displacement (a displacement along the x-axis) should take place at the same time in the rigid portion 21c albeit extremely small.

A discussion will next be made of a displacement which could occur in the parallel flexible-beam displacement mechanism 29b if the associated parallel flexible-beam displacement mechanism 29a were not provided. Since the parallel flexible-beam displacement mechanism 29b is constructed plane-symmetrically with the parallel flexible beam displacement mechanism 29a relative to a plane (standard plane) which extends along the y-axis through the center of the rigid portion 21c, the rigid portion 21c also undergoes the above-mentioned lateral displacement in unison with a displacement along the z-axis upon application of the force f which is plane-symmetrical, relative to the standard plane, with the force f applied to the parallel flexible-beam displacement mechanism 29a. Relative to the standard plane, the magnitude and direction of the lateral displacement are plane-symmetrical with those of the lateral displacement of the parallel flexible-beam displacement mechanism 29a. Regarding the above-described lateral displacements, the lateral displacement occurred in the parallel flexible-beam displacement mechanism 29a is a combination of a displacement occurred in the leftward direction along the x-axis as viewed in the drawing and an angular displacement occurred counterclockwise about the y-axis as viewed in the same drawing, while the lateral displacement occurred in the parallel flexible-beam displacement mechanism 29b is a combination of a displacement occurred in the rightward direction along the x-axis as viewed in the drawing and an angular displacement occurred clockwise about the y-axis as viewed in the same drawing. Further, the magnitudes of the displacements along the x-axis are equal to each other and those of the angular displacements about the y-axis are also equal to each other. The lateral displacements occurred respectively in the parallel flexible-beam displacement mechanisms 29a,29b and canceled each other. As a result, a slight increase in internal stress is alone caused to occur in each of the parallel flexible beams $24a_1,24a_2,24b_1,24b_2$ due to a lengthwise elongation thereof by the application of the force f and the rigid portion 21c undergoes a displacement (principal displacement) ε along the z-axis only.

As soon as the voltages applied to the piezoelectric actuators 26a,26b are removed, the parallel flexible beams $24a_1,24a_2,24b_1,24b_2$ returns to their respective state before their deformation so that the parallel flexible-beam displacement mechanisms 29a,29b return to their respective state shown in FIG. 6A and the displacement ε is reduced to 0. Accurate positioning can be performed by detecting actual displacements by the respective strain gauges S in the course of the above-described operation and then effecting a feedback control based on the displacements. Such a controller will be described subsequently.

The operation of the embodiment shown in FIG. 5 will next be described. When an identical voltage is applied to each of the piezoelectric actuators of the parallel flexible-beam displacement mechanisms $16F_{xa},16F_{xb}$, their parallel flexible beams $24a_1,24a_2,24b_1,24b_2$ are deformed respectively along the x-axis of FIG. 5 in proportion to the applied voltages as shown in FIG. 6B so that they undergo translational displacements.

Since these parallel flexible-beam displacement mechanisms $16F_{xa},16F_{xb}$ are unitary with the central rigid portion 15, the parallel flexible-beam displacement mechanisms $17F_{ya},17F_{yb}$ and the fine motion table 20 fixed on the fixed portions 19a,19b, their translational displacements along the x-axis are transmitted to the fine motion table 20 as they are. The fine motion table 20 thus undergoes a translational displacement to the same degree along the x-axis. When an identical voltage is applied to each of the piezoelectric actuators of the parallel flexible-beam displacement mechanisms $17F_{ya},17F_{yb}$ in the same manner, the fine motion table 20 undergoes a translational displacement along the y-axis. In addition, a combined translational displacement can be obtained when these respective parallel flexible-beam mechanisms are actuated at the same time.

Owing to the above-described structure, the fine positioning device of the first embodiment can avoid lateral displacements and can obtain translational displacements along two axes in spite of its extremely simple and small construction.

Figure 7:
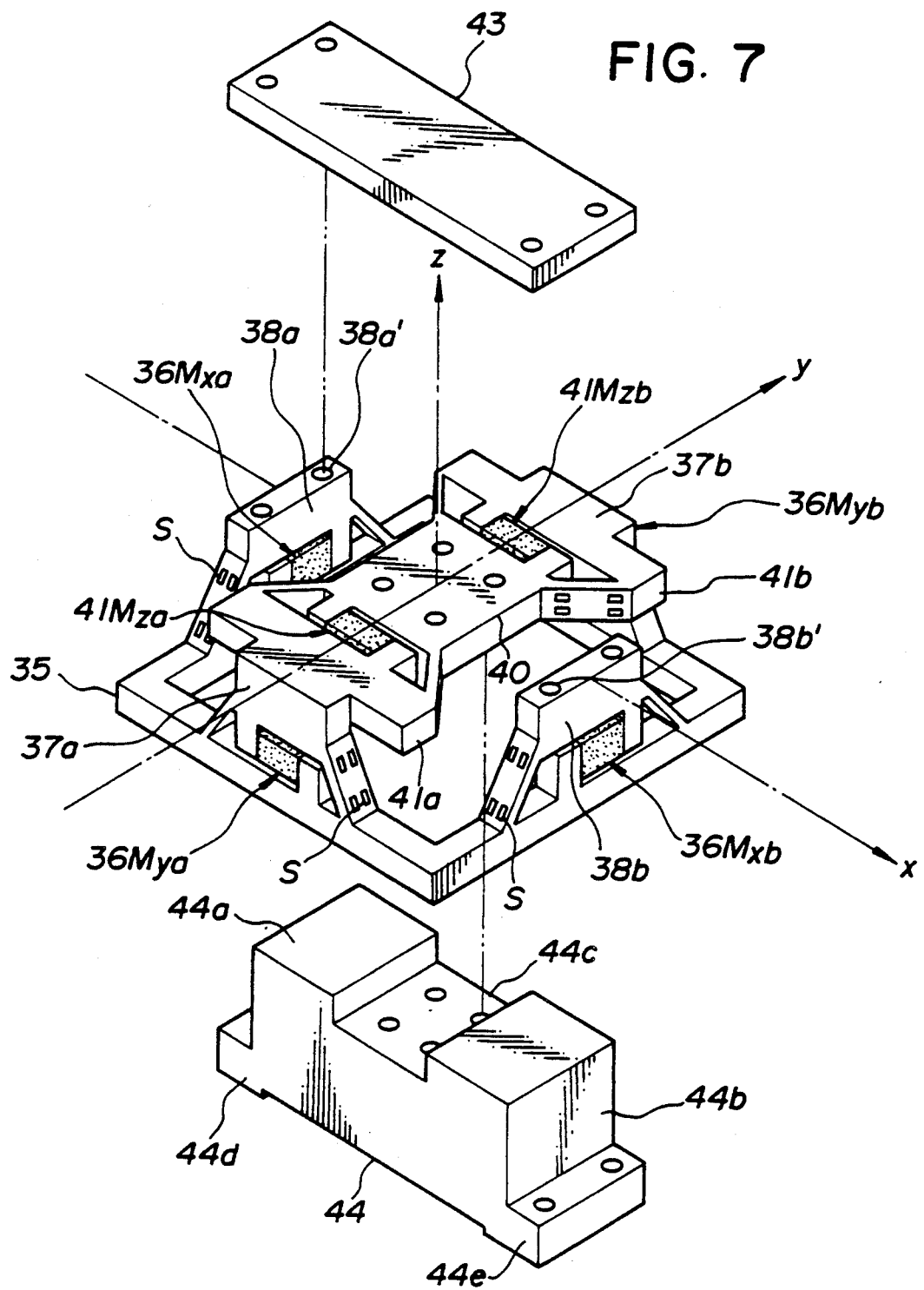
FIG. 7 is an exploded perspective view of a fine positioning device according to a second embodiment of this invention.

FIG. 7 is an exploded perspective view of the fine positioning device according to the second embodiment of this invention. In the drawing, x, y and z indicate coordinate axes respectively. Designated at numeral 35 is a square ring made of a rigid material. Numerals $36M_{ya}$ and $36M_{yb}$ indicate respectively radial flexible-beam displacement mechanisms arranged symmetrically on the ring 35. Each of the radial flexible-beam displacement mechanisms $36M_{ya},36M_{yb}$ produces angular displacements about the y-axis. Numerals $36M_{xa}$ and $36M_{xb}$ indicate respectively radial flexible-beam displacement mechanisms arranged symmetrically on the ring 35. They individually produces angular displacements about the x-axis. The structure of each of the radial flexible-beam displacement mechanisms $36M_{ya},36M_{yb},36M_{xa},36M_{xb}$ will be described subsequently.

Numerals 37a,37b indicate one set of rigid portions forming the radial flexible-beam displacement mechanisms $36M_{ya},36M_{yb}$ respectively (the other rigid portion being the ring 35), while numerals 38a,38b indicate one set of rigid portions forming the radial flexible-beam displacement mechanisms $36M_{xa},36M_{xb}$ respectively (the other rigid portion being also the ring 35). Designated at numerals 38a' and 38b' are attachment portions provided on the upper surfaces of end portions 38a,38b respectively.

Designated at numeral 40 is a central rigid portion, numeral 41a indicates an outwardly-extending portion extending out along the y-axis from the central rigid portion 40, and numeral 41b designates another outwardly-extending portion extending out from the central rigid portion 40 in a direction opposite to the former outwardly-extending portion 41a. The outwardly-extending portion 41a and the rigid portion 37a of the radial flexible displacement mechanisms $36M_{ya}$ are connected to each other, whereas the outwardly-extending portion 41b and the rigid portion 37b of the radial flexible displacement mechanisms $36M_{yb}$ are connected to each other.

Numerals $41M_{za},41M_{zb}$ indicate radial flexible-beam displacement mechanisms formed in the outwardly-extending portions 41a,41b respectively. They are arranged symmetrically to each other relative to the central rigid portion 40. These radial flexible-beam displacement mechanisms $41M_{za},41M_{zb}$ cooperate to produce angular displacements about the z-axis. These radial flexible-beam displacement mechanisms $41M_{za}$, $41M_{zb}$ and the aforementioned radial flexible-beam displacement mechanisms $36M_{xa},36M_{xb},36M_{ya},36M_{yb}$ are constructed by forming desired through-holes at predetermined locations. The structure of the radial flexible-beam displacement mechanisms $41M_{za},41M_{zb}$ will also be described subsequently.

The ring 35, the rigid portions 37a,37b,38a,38b, the individual radial displacement flexible-beam mechanisms formed between the ring and the rigid portions 37a,37b,38a,38b, the central rigid portion 40, and the outwardly-extending portions 41a,41b are all formed as an integral unit from a single piece of high-rigidity material.

Numeral 43 indicates a fine motion table mounted on attachment portions 38a',38b' of the rigid portions 38a,38b. An object to be subjected to fine positioning is fixedly mounted on the fine motion table 43. The manner of attachment between the fine motion table 43 and attachment portions 38a',38b' is indicated at one location only by a two-dot chain line in the drawing. Incidentally, it is not absolutely necessary to limit the shape of the fine motion table 43 to a rectangular shape as shown in the drawing. It may be formed into any shape facilitating the fixed mounting of an object, such as a substantially square shape in which the y-axis dimension of the fine motion table has been increased further.

Numeral 44 indicates a mount made of a rigid material. The mount 44 is formed of a recessed portion 44c, land portions 44a,44b provided on both sides of the recessed portion 44c, and attachment portions 44d,44e extending out from lower end portions of the respective land portions 44a,44b. The central rigid portion 40 is fit and fixed in the recessed portion 44c. The manner of this fixed fitting is indicated at one location only by a two-dot chain line in the drawing. The attachment portions 44d,44e are fixed on the fixing portions (not shown). With the central rigid portion 40 fixed on the recessed portion 44c, a major portion of the mount 44 is received within a space surrounded by the ring 35. Thus, the radial flexible-beam displacement mechanisms $36M_{xa}$, $36M_{xb}$, $36M_{ya},36M_{yb}$ are suspended together with the ring 35 from the outwardly-extending portions 41a, 41b.

In the drawing, letter S indicates strain gauges provided with each of the radial flexible-beam displacement mechanisms.

The structure of each radial flexible-beam displacement mechanism is now explained with reference to FIGS. 8A and 8B, which are side views of the radial flexible-beam displacement mechanism respectively. In the drawings, numerals 45a,45b indicate rigid portions located on left-hand and right-hand sides respectively. Designated at numerals 46,46' are planar radial flexible beams formed between the rigid portions 45a,45b as integral members with the rigid portions 45a,45b and arranged radially about a fixed point O as a center. Numeral 47 indicates a through-hole bored to form the radial flexible beams 46,46' and rigid portions 45a,45b as an integral unit. Numeral 48a indicates a tongue projecting into the through-hole 47 from the rigid portion 45a while numeral 48b designates another tongue projecting into the through-hole 47 from the rigid portion 45b. These tongues 48a,48b are overlapped with each other in the vertical direction as viewed in the drawing, with an interval left therebetween. Designated at numeral 49 is a piezoelectric actuator fixed between the tongue 48a and tongue 48b. When a circle passing through the piezoelectric actuator 49 is drawn about the point O, the piezoelectric actuator 49 generates a force f (which can be considered as a torque relative to the point O) in a direction tangent to the circle so that a bending deformation is caused to occur in each of the radial flexible beams. The magnitude of such a force is controlled by a voltage to be applied to the piezoelectric actuator 49. Numeral 50 indicates a rigid structure on which the rigid portion 45a is supported. Letter S indicates strain gauges cemented to the respective radial flexible beams at desired locations. These strain gauges S are provided to detect the degrees of displacements of the radial flexible beams.

In the above structure, a radial flexible-beam displacement mechanism 52 is constructed by the rigid portions 45a,45b, radial flexible beams 46,46', tongues 48a,48b and piezoelectric actuator 49. A line which extends through the point O and is perpendicular to the drawing sheet will hereinafter be considered as a standard axis showing the position and the direction of arrangement of the radial flexible-beam displacement mechanism 52.

The operation of the above radial flexible-beam displacement mechanism 52 will next be described with reference to FIG. 8B. FIG. 8B is a side view of the radial flexible-beam displacement mechanism 52, which is illustrated in FIG. 8A, after its deformation. Let's now apply a voltage to the piezoelectric actuator 49 to generate the force f in the direction of the above-mentioned tangent line. The tongue 48b is then pushed upwardly along the tangent line by the force generated in the piezoelectric actuator 49. The rigid portion 45b is in a state connected to the rigid portion 45a by way of the radial flexible beams 46,46'. As a result of application of the above force, portions of the flexible beams 46,46' at which portions the flexible beams 46,46' are connected to the rigid portion 45a remain respectively on straight lines $L_1,L_2$ extending out radially from the point O but portions of the flexible beams 46,46' at which portions the flexible beams 46,46' are connected to the rigid portion 45b undergo small displacements so that the latter portions are displaced onto straight lines $L_{1'},L_{2'}$ (the straight lines $L_{1'},L_{2'}$ also extend out radially from the point O) offset slightly from the corresponding straight lines $L_1,L_2$. As a consequence, the rigid portion 45b is caused to turn over a small angle δ clockwise as viewed in the drawing. Since the degree of this angular displacement δ is determined by the flexural rigidity of the radial flexible beams 46,46', the angular displacement δ can be controlled with the same accuracy as the force f provided that the force f is controlled precisely.

Figure 8A:
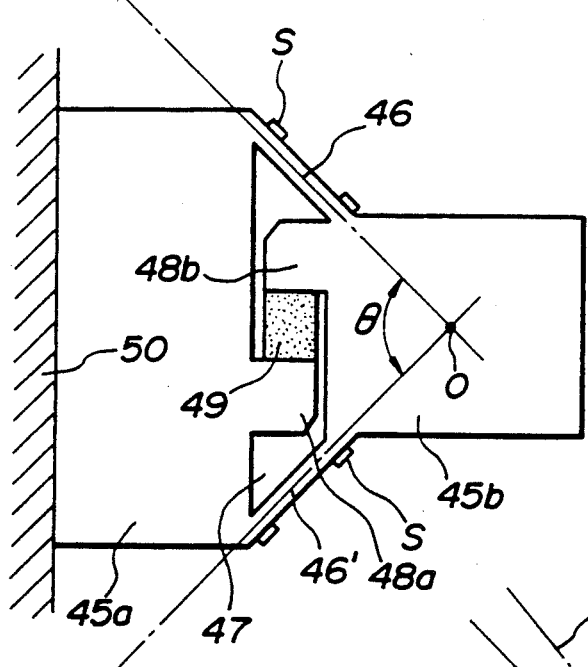
FIGS. 8A and 8B are side views of an asymmetrical radial flexible-beam displacement mechanism.

After elimination of the voltage applied to the piezoelectric actuator 49, the individual radial flexible beams 46,46' are allowed to return their respective states before their deformations so that the radial flexible-beam displacement mechanism 52 returns to the state depicted in FIG. 8A and the angular displacement δ is reduced to 0. An accurate angular displacement can be produced in the above operation if a feedback control is effected based on values detected by the strain gauges S.

From the above description of the radial flexible-beam displacement mechanism, it has now been understood that the standard axis of each of the radial flexible-beam displacement mechanisms $36M_{ya},36M_{yb}$ shown in FIG. 7 is the y-axis while the standard axis of each of the radial flexible-beam displacement mechanisms $36M_{xa},36M_{xb}$ is the x-axis. It has also been appreciated that the ring 35 depicted in FIG. 7 corresponds to the rigid portion 45b while the rigid portions 37a,37b,-

38a,38b correspond to the rigid portion 45a. Further, the respective standard axes y,x of the radial flexible-beam displacement mechanisms $36M_{ya},36M_{yb},36M_{xa},36M_{xb}$ shown in FIG. 7 may be set to extend on the surface of the fine motion table 43 provided that the opening angle $\theta$ between their associated radial flexible beams 46,46' is chosen suitably.

The radial flexible-beam displacement mechanisms $41M_{za},41M_{zb}$ shown in FIG. 7 share the rigid portion 45b. Two rigid portions, each of which is of the same type as the rigid portion 40, are provided on both sides of the common rigid portion 45b, whereby a symmetrical radial flexible-beam displacement mechanism is formed. In this construction, the rigid portion 45b is fixed in contrast to the structure depicted in FIG. 8A. The symmetrical radial flexible-beam displacement mechanism will next be described.

Figure 9A:
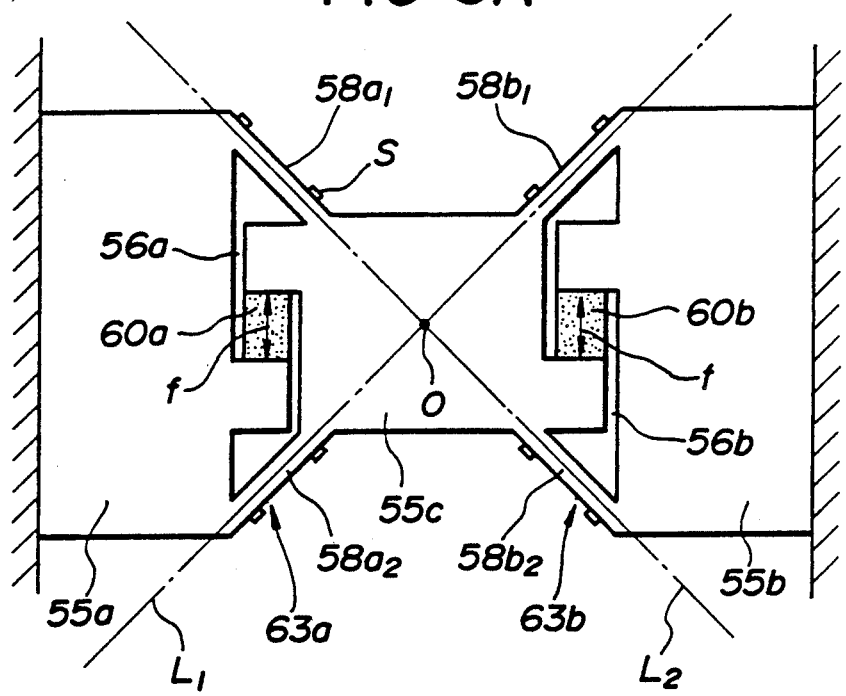
FIGS. 9A and 9B are side views of a symmetrical radial flexible-beam displacement mechanism.
Figure 9B:
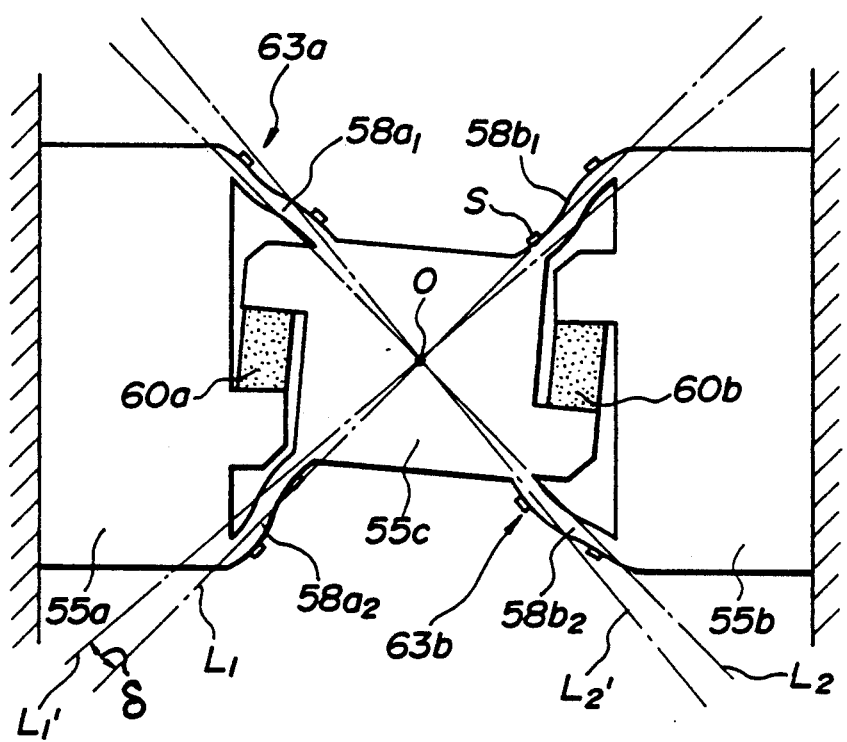

FIGS. 9A and 9B are side views of the symmetrical radial flexible-beam displacement mechanism, in which numerals 55a,55b,55c indicate rigid portions while numerals $58a_1$, $58a_2$, $58b_1$ and $58b_2$ designate radial flexible beams. The radial flexible beams $58a_1$, $58a_2$, $58b_1$ and $58b_2$ extend radially along their corresponding two-dot chain lines $L_1,L_2$ relative to an axis $\theta$ which extends through the center of the rigid portion 55c and is perpendicular to the drawing sheet. The radial flexible beams $58a_1$, $58a_2$, $58b_1$ and $58b_2$ therefore connect the corresponding adjacent rigid portions. The radial flexible beams $58a_1,58a_2$ are formed by boring a through-hole 56a, while the radial flexible beams $58b_1,58b_2$ are formed by boring a through-hole 56b. Designated at numerals 60a,60b are piezoelectric actuators, which are mounted between their corresponding tongues extending into the through-holes 56a,56b from the corresponding rigid portions. A radial flexible-beam displacement mechanism 63a is constructed by the elements on the left-hand side of the axis O, while a radial flexible-beam displacement mechanism 63b is constructed by the elements on the right-hand side of the axis O. Letter S indicate strain gauges cemented on the radial flexible beams at desired locations. The strain gauges S are provided to detect the degrees of deformations of the radial flexible beams.

Let's now apply predetermined voltages respectively to the piezoelectric actuators 60a,60b at the same time to generate forces f of the same magnitude in directions tangent to a circle drawn about the central axis O as a center. The left-hand tongue of the rigid portion 55c is then pushed upwardly along the tangent line by the force generated in the piezoelectric actuator 60a. On the other hand, the right-hand tongue of the rigid portion 55c is pushed downwardly along the tangent line by the force generated in the piezoelectric actuator 60b. The rigid portion 55c is in a state connected to the rigid portions 55a,55b by way of the radial flexible beams $58a_1,58a_2,58b_1,58b_2$. As a result of application of the above forces portions of the flexible beams $58a_1,58a_2,58b_1,58b_2$ at which portions the flexible beams are connected to their corresponding rigid portion 55a,55b as shown in FIG. 9B remain respectively on straight lines $L_1,L_2$ extending out radially from the point O but portions of the flexible beams at which portions the flexible beams are connected to the rigid portion 55c undergo small displacements so that the latter portions are displaced onto straight lines $L_{1'},L_{2'}$ (which are also straight lines extending radially from the point O) offset slightly from the corresponding straight lines $L_1,L_2$. As a consequence, the rigid portion 55c is caused to turn over a small angle $\delta$ clockwise as viewed in the drawing. Since the degree of this angular displacement $\delta$ is determined by the flexural rigidity of the radial flexible beams $58a_1,58a_2,58b_1,58b_2$, the angular displacement $\delta$ can be controlled with the same accuracy as the forces f provided that the forces f are controlled precisely.

After elimination of the voltages applied respectively to the piezoelectric actuator 60a,60b, the individual radial flexible beams $58a_1,58a_2,58b_1,58b_2$, are allowed to return their respective states before their deformations so that the radial flexible-beam displacement mechanism returns to the state depicted in FIG. 9A and the angular displacement $\delta$ is reduced to 0. Similar to the parallel and radial flexible-beam displacement mechanisms described above, the strain gauges S are employed to achieve accurate fine positioning.

The operation of the fine positioning device shown in FIG. 7 is now described. When voltages are applied respectively to the piezoelectric actuators of the radial flexible-beam displacement mechanisms $36M_{ya}$, $36M_{yb}$, the planer flexible beams 46,46' are deformed in proportion to the voltages as depicted in FIG. 8B. Since the rigid portion 37a is in a state fixed via the central rigid portion 40 and radial flexible-beam displacement mechanisms $41M_{za},41M_{zb}$, the radial flexible-beam displacement mechanisms $36M_{ya},36M_{yb}$ produce angular displacements about the y-axis so that the fine motion table 43 undergoes an angular displacement about the y-axis.

When voltages are applied respectively to the piezoelectric actuators of the radial flexible-beam displacement mechanisms $36M_{xa},36M_{xb}$ on the other hand, the radial flexible beams are deformed in proportion to the voltages so that angular displacements are produced about the x-axis. Since the ring 35 is in a state fixed via the radial flexible-beam displacement mechanisms $36M_{ya},36M_{yb},41M_{za},41M_{zb}$, these angular displacements are transmitted to the rigid portions 38a,38b and the fine motion table 43 undergoes an angular displacement about the x-axis.

When voltages are applied respectively to the piezoelectric actuators of the radial flexible-beam displacement mechanisms $41M_{za},41M_{zb}$ on the other hand, the radial flexible beams are deformed in proportion to the voltages so that angular displacements are produced about the z-axis. These angular displacements are then transmitted to the fine motion table 43 by way of the rigid portions 37a,37b, radial flexible-beam displacement mechanisms $36M_{ya},36M_{yb}$, ring 35, radial flexible-beam displacement mechanisms $36M_{xa},36M_{xb}$ and rigid portions 38a,38b, whereby the fine motion table 43 undergoes an angular displacement about the z-axis.

Further, when desired two or more of the radial flexible-beam displacement mechanisms $36M_{ya},36M_{yb}$, radial flexible-beam displacement mechanisms $36M_{xa}$, $36M_{xb}$ and radial flexible-beam displacement mechanisms $41M_{za},41M_{zb}$ are chosen and driven simultaneously, the fine motion table 43 undergoes an angular displacement which is a combination of angular displacements of the desired two or more radial flexible-beam displacement mechanisms.

In the above description of the second embodiment of this invention, the crossing point of the x-axis, y-axis and z-axis is located on the surface of the fine motion table. It is however not essential for the crossing point to assume a position on the surface of the fine motion table. The location of the crossing point can therefore be selected at any location as desired.

Owing to the above-described structure, the fine positioning device of the second embodiment can obtain angular displacements about three axes in spite of its simple structure. Since the y-axis and x-axis which are standard axes of each radial flexible-beam displacement mechanism are positioned on the fine motion table, the turning center of each angular displacement is also located on the fine motion table so that the angular displacement can be achieved accurately.

Figure 10:
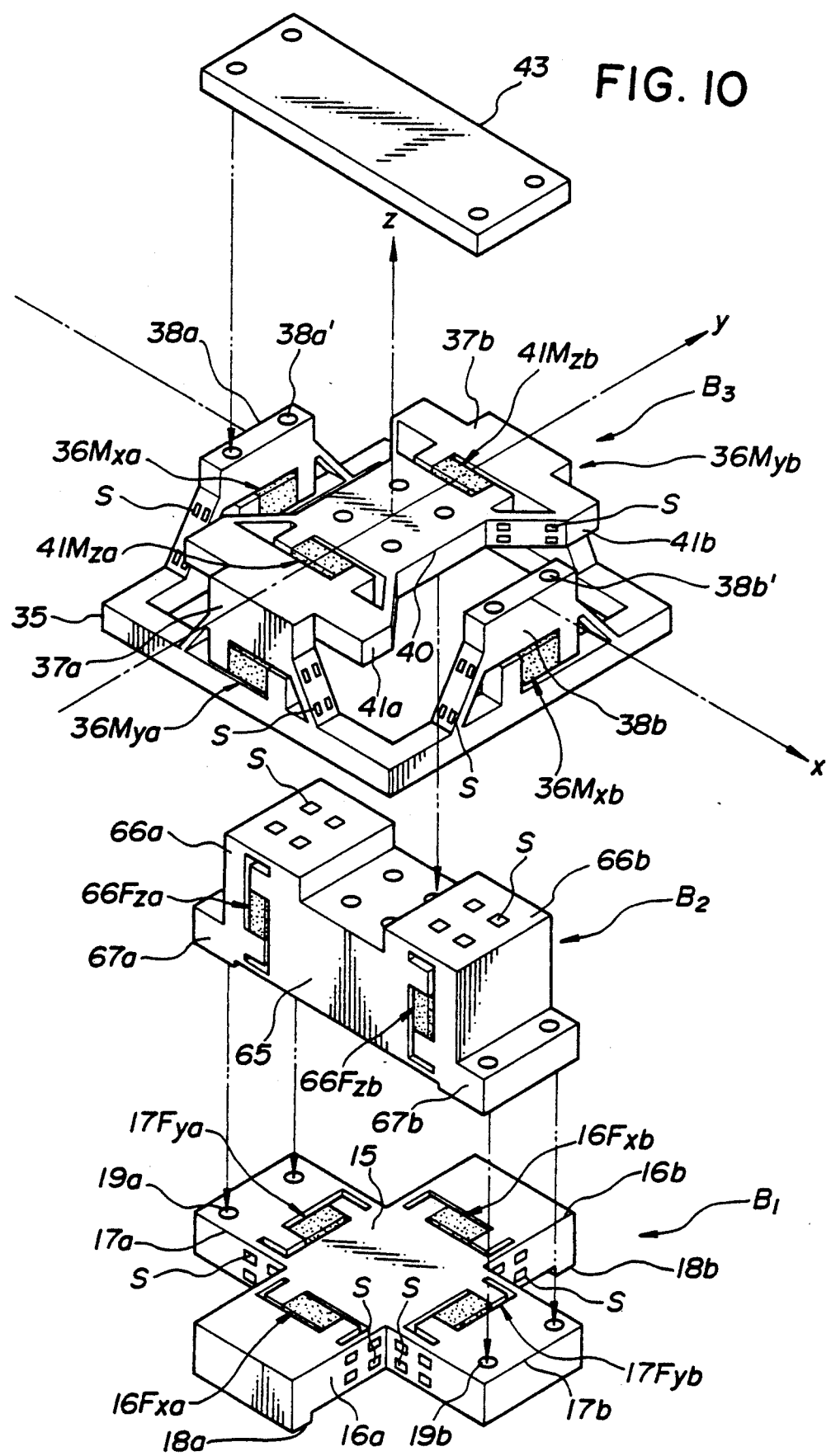
FIG. 10 is an exploded perspective view of a fine positioning device according to a third embodiment of this invention.

FIG. 10 is an exploded perspective view of a fine positioning device according to the third embodiment of this invention. This embodiment is a combination of the fine positioning device according to the first embodiment, the fine positioning device according to the second embodiment and a further fine positioning device capable of producing translational displacements along two axes, thereby constructing a 6-axis fine positioning device (translational displacements along the x-, y- and z-axes and angular displacements about the x-, y- and z-axes). In the drawing, letter $B_1$ indicates a block constituting the same fine positioning device as that shown in FIG. 5, while letter $B_3$ designates another block constituting the same fine positioning device as that depicted in FIG. 7. Among elements forming these blocks $B_1, B_3$, those similar to their corresponding parts in FIGS. 5 and 7 are identified by like reference numerals and letters and their description is omitted herein.

A block $B_2$ is a block constructed of a fine positioning device having the same external shape as the mount 44 shown in FIG. 7. In the drawing, there are shown a central rigid portion 65 made of a material having high rigidity, an outwardly-extending portion 66a extending out from the central rigid portion 65 along the x-axis, and another outwardly-extending portion 66b extending out from the central rigid portion 65 in a direction opposite to the outwardly-extending portion 66a. Designated at numerals 67a,67b are connecting portions extending out respectively from lower edge portions of the outwardly-extending portions 66a,66b. The connecting portions 67a,67b are connected to connecting portions 19a,19b of the block $B_1$. This connection is indicated by two-dot chain lines. The central rigid portion 65, outwardly-extending portions 66a,66b and connecting portions 67a,67b are worked out as an integral unit from a single block.

Designated at numerals $66F_{za}, 66F_{zb}$ are parallel flexible-beam displacement mechanisms constructed in the outwardly-extending portions 66a,66b respectively. The parallel flexible-beam displacement mechanisms $66F_{za}, 66F_{zb}$ are arranged symmetrically to each other relative to the central rigid portion 65. These parallel flexible-beam displacement mechanisms $66F_{za}$, $66F_{zb}$ cooperate with each other to produce translational displacements along the z-axis. The parallel flexible-beam displacement mechanisms $66F_{za}, 66F_{zb}$ are formed by boring predetermined through-holes in the corresponding outwardly-extending portions 66a,66b at desired locations respectively.

The block $B_2$ is connected to the central rigid portion 40 of the block $B_3$. Namely, the central rigid portion 40 of the block $B_3$ is superposed on the central rigid portion 65 of the block $B_2$ and the block $B_2$ and block $B_3$ are then connected to each other by a suitable means (one of connecting routes is indicated by a double-dot chain line in the drawing). In this state, a major part of the block $B_2$ is received within the space of the block $B_3$. Hence, the radial flexible-beam displacement mechanisms $36M_{xa}, 36M_{xb}, 36M_{ya}, 36M_{yb}$ are suspended together with the ring 35 from the outwardly-extending portions 41a,41b.

The fine motion table 43 is connected to the rigid portions not connected to the outwardly-extending portions 41a,41b in the block $B_3$, namely to the connecting portions 38a',38b' of the rigid portions 38a,38b (one of these connecting routes is indicated by a double-dot chain line in the drawing). Incidentally, it is not absolutely necessary to limit the shape of the fine motion table 43 to a rectangular shape as shown in the drawing. It may be formed into any shape facilitating the fixed mounting of an object, such as a substantially square shape in which the y-axis dimension of the fine motion table has been increased further.

In the above-described structure, the turning axes of the respective radial flexible-beam displacement mechanisms $36M_{xa}, 36M_{xb}, 36M_{ya}, 36M_{yb}, 41M_{za}, 41M_{zb}$ can be designed to cross perpendicularly at one point on the surface of the fine motion table 43 by choosing the opening angles of the respective flexible beams suitably.

The operation of the fine positioning device of the third embodiment of this invention shown in FIG. 10 will next be described. Let's now assume that voltages are applied respectively to the piezoelectric actuators of the parallel flexible-beam displacement mechanisms $16F_{xa}, 16F_{xb}$. Their parallel flexible beams are deformed respectively along the x-axis of FIG. 10 in proportion to the applied voltages as shown in FIG. 6B so that they undergo translational displacements. These translational displacements are then transmitted to the fine motion table 43 fixed on the rigid portions 38a,38b by way of the parallel flexible-beam displacement mechanisms $17F_{ya}, 17F_{yb}$, $66F_{za}, 66F_{zb}$, central rigid portions 65,40, radial flexible-beam displacement mechanisms $41M_{za}, 41M_{zb}$, rigid portions 37a,37b, radial flexible-beam displacement mechanisms $36M_{ya}, 36M_{yb}$, ring 35, and radial flexible-beam displacement mechanisms $36M_{xa}, 36M_{xb}$, so that the fine displacement table 43 undergoes a translational displacement along the x-axis.

Similarly, when voltages are applied respectively to the piezoelectric actuators of the parallel flexible-beam displacement mechanisms $17F_{ya}, 17F_{yb}$, the fine motion table 43 undergoes a translational displacement along the y-axis. When voltages are applied respectively to the piezoelectric actuators of the parallel flexible-beam displacement mechanisms $66F_{za}, 66F_{zb}$, the fine motion table 43 undergoes a translational displacement along the z-axis.

On the other hand, when voltages are applied respectively to the piezoelectric actuators of the radial flexible-beam displacement mechanisms $36M_{ya}$, $36M_{yb}$, the fine motion table 43 undergoes an angular displacement about the y-axis in proportion to the voltages applied. When voltages are applied respectively to the piezoelectric actuators of the radial flexible-beam displacement mechanisms $36M_{xa}, 36M_{xb}$, the fine motion table 43 undergoes a radial displacement about the x-axis. When voltages are applied respectively to the piezoelectric actuators of the radial flexible-beam displacement mechanisms $41M_{za}, 41M_{zb}$, the fine motion table 43 undergoes an angular displacement about the z-axis.

Both translational and angular displacements with respect to one axis have been described. The fine motion table 43 can however be displaced as desired by choosing desired plural displacement mechanisms from the above-described parallel flexible-beam displacement mechanisms and radial flexible-beam displacement mechanisms and then applying desired voltages to the thus-chosen displacement mechanisms. In addition, the degree of each displacement can be controlled accurately by using strain gauges S.

In the above description of the third embodiment, the end portions of the outwardly-extending portions extending out along the y-axis in the block $B_1$ are fixed while its connecting portions are provided at the end portions of the outwardly-extending portions extending out along the x-axis. Needless to say, it is apparent that an opposite arrangement is feasible, namely, the end portions of the outwardly-extending portions extending out along the x-axis may be fixed and the block $B_2$ may be connected to the end portions of the outwardly-extending portions extending out along the y-axis. Each of the turning axes is not absolutely required to assume a position on the surface of the fine motion table. The position of each turning axis can be chosen as desired.

Owing to the above-described structure, the fine positioning device according to the third embodiment can obtain translational displacements along three axes and angular displacements about three axes in spite of its simple and small structure. Since all the turning axes cross perpendicularly at one point on the surface of the fine motion table, the turning center of angular displacements is located on the fine motion table so that accurate angular displacement can be effected.

Figure 11:
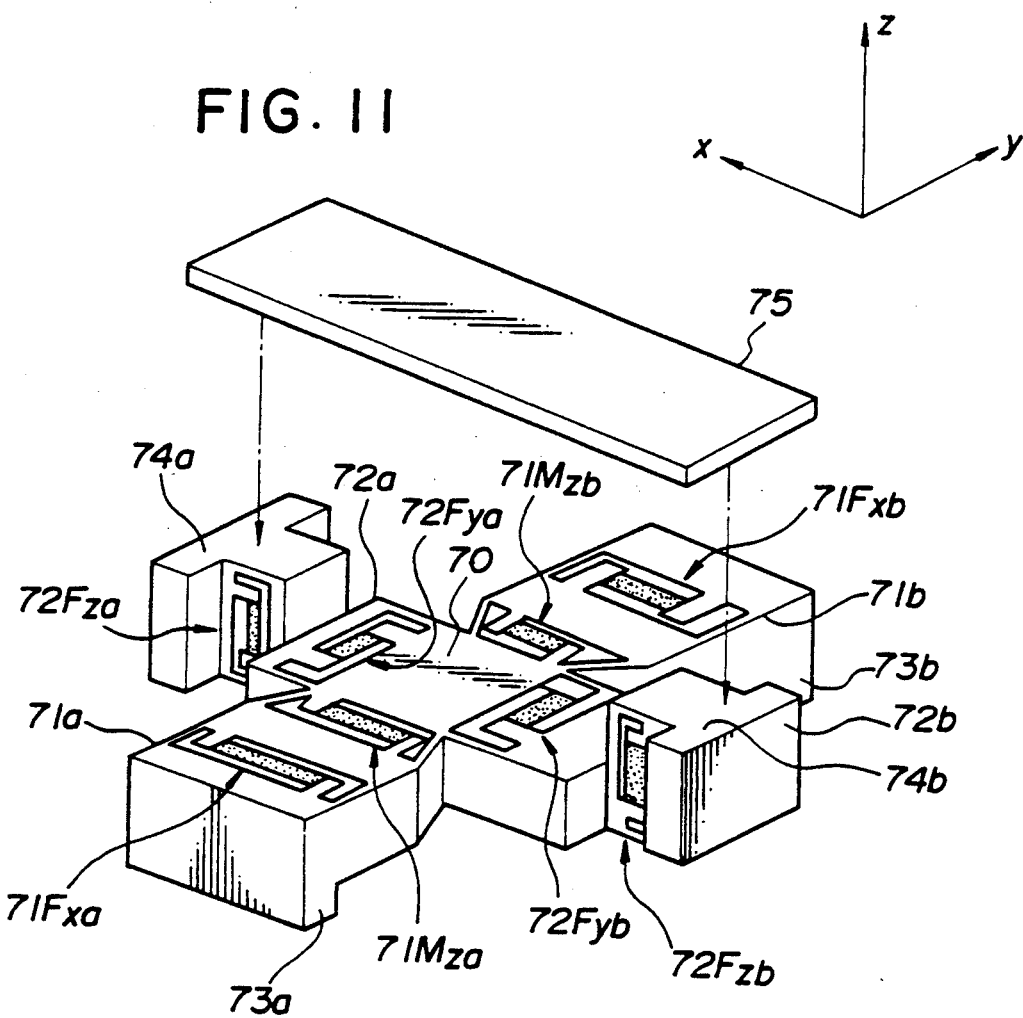
FIG. 11 is an exploded perspective view of a fine positioning device according to a fourth embodiment of this invention.

FIG. 11 is an exploded perspective view of the fine positioning device according to the fourth embodiment of this invention. This embodiment has a structure which is obtained by adding to the first embodiment a radial flexible-beam displacement mechanism capable of producing angular displacements about two axes and a parallel flexible-beam displacement mechanism capable of producing translational displacements along two axes. In the drawings, x, y and z indicate respectively coordinate axes which are perpendicular to one another. There are also shown a central rigid portion 70, an outwardly-extending portion 71a extending out along the y-axis from the central rigid portion 70, an outwardly-extending portion 71b extending out from the central rigid portion 70 in a direction opposite to the outwardly-extending portion 71a, an outwardly-extending portion 72a extending out along the x-axis from the central rigid portion 70, and an outwardly-extending portion 72b extending out from the central rigid portion 70 in a direction opposite to the outwardly-extending portion 72a. Numerals 73a,73b designate fixing portions provided at lower edge portions of the outwardly-extending portions 71a,71b respectively. Designated at numerals 74a,74b are fine motion table connecting portions provided on upper end portions of the outwardly-extending portions 72a,72b respectively. Numeral 75 indicates a fine motion table. The outwardly-extending portions 71a,71b,72a,72b, fixing portions 73a,73b and fine motion table connecting portions 74a,74b are all formed of the same material as the central rigid portion 70. They are worked out together with the central rigid portion 70 from a single piece of block.

Designated at numeral $71M_{za},71M_{zb}$ are respectively radial flexible-beam displacement mechanisms, which are constructed in the outwardly-extending portions 71a,71b respectively. The radial flexible-beam displacement mechanisms are constructed symmetrically to each other with respect to the central rigid portion 70 and cooperate with each other to produce angular displacements about an axis extending in the direction of the z-axis. Numerals $71F_{xa},71F_{xb}$ indicate respectively parallel flexible-beam displacement mechanisms provided outside the respective radial flexible-beam displacement mechanisms $71M_{za},71M_{zb}$ in the outwardly-extending portions 71a,71b. The parallel flexible-beam displacement mechanisms $71F_{xa}, 71F_{xb}$ are constructed symmetrically to each other relative to the central rigid portion 70 and cooperate with each other to produce translational displacements along the x-axis.

Designated at numeral $72F_{ya},72F_{yb}$ are respectively parallel flexible-beam displacement mechanisms, which are constructed in the outwardly-extending portions 72a,72b respectively. The parallel flexible-beam displacement mechanisms are constructed symmetrically to each other with respect to the central rigid portion 70 and cooperate with each other to produce translational displacements along the y-axis. Numerals $72F_{za},72F_{zb}$ indicate respectively parallel flexible-beam displacement mechanisms provided outside the respective parallel flexible-beam displacement mechanisms $72F_{ya},72F_{yb}$ in the outwardly-extending portions 72a,72b. The parallel flexible-beam displacement mechanisms $72F_{za},72F_{zb}$ are constructed symmetrically to each other relative to the central rigid portion 70 and cooperate with each other to produce translational displacements along the z-axis. The portions where the parallel flexible-beam displacement mechanisms $72F_{za}, 72F_{zb}$ are constructed are formed in such a way that their upper end portions are taller than the other portions.

The radial flexible-beam displacement mechanisms $71M_{za},71_{zb}$ and parallel flexible-beam displacement mechanisms $71F_{xa},71F_{xb},72F_{ya},72F_{yb},72F_{za},72F_{zb}$ are constructed by boring predetermined through-holes in the respective outwardly-extending portions 71a,71b,-72a,72b at desired locations.

The operation of the fine positioning device of the fourth embodiment of this invention shown in FIG. 11 will next be described. Let's now assume that equal voltages are applied respectively to the piezoelectric actuators of the parallel flexible-beam displacement mechanisms $71F_{xa},71F_{xb}$. Their parallel flexible beams are deformed respectively along the x-axis of FIG. 11 in proportion to the applied voltages as shown in FIG. 6B so that they undergo translational displacements. These translational displacements along the x-axis are then transmitted, as they are, to the fine motion table 75 and the fine motion table 75 undergoes a translational displacement to the same degree along the x-axis, since these parallel flexible-beam displacement mechanisms $71F_{xa},71F_{xb}$ are integral with the radial flexible-beam displacement mechanisms $71M_{za}, 71M_{zb}$, central rigid portion 70, parallel flexible-beam displacement mechanisms $72F_{ya},72F_{yb},72F_{za},72F_{zb}$, and the fine motion table 75 fixed on the fixing portions 74a,74b.

On the other hand, when equal voltages are applied respectively to the piezoelectric actuators of the radial flexible-beam displacement mechanisms $71M_{za},71M_{zb}$, their radial flexible beams are deformed about the z-axis of FIG. 11 to undergo angular displacements as shown in FIG. 9B. These angular displacements are transmitted to the fine motion table 75 by way of the central rigid portion 70 parallel flexible-beam displacement mechanisms $72F_{ya},72F_{yb},72F_{za}, 72F_{zb}$, and fixing portions 74a,74b, so that the fine motion table 75 undergoes an angular displacement about the same axis.

Similarly, when an identical voltage is applied to each of the piezoelectric actuators of the parallel flexible-beam displacement mechanisms $72F_{ya}, 72F_{yb}$, the fine motion table 75 undergoes a translational displacement along the y-axis. When an identical voltage is applied to each of the piezoelectric actuators of the parallel flexible-beam displacement mechanisms $72F_{za}, 72F_{zb}$, the fine motion table 75 undergoes a translational displacement along the z-axis.

When two or more sets of these flexible-beam displacement mechanisms are driven at the same time, a combined translational displacement or a combined displacement of both translational and angular displacements can be obtained.

In the above description of the fourth embodiment, parallel flexible-beam displacement mechanisms are provided to produce translational displacements along the z-axis. The parallel flexible-beam displacement mechanism may be removed depending on the application field. In the above description of the fourth embodiment, the end portions of the outwardly-extending portions extending out along the y-axis are fixed and the fine motion table is provided on the end portions of the outwardly-extending portions extending out along the x-axis. Needless to say, it is apparent that an opposite arrangement is feasible, namely, the end portions of the outwardly-extending portions extending out along the x-axis may be fixed and the fine motion table may be provided on the end portions of the outwardly-extending portions extending out along the y-axis. Further, the portions on which the fine motion table is fixed is constructed taller than the other portions. These portions may however be formed at the same height as the other portions and legs may instead be provided on the side of the fine motion table.

Owing to the above-described structure, the fine positioning device according to the fourth embodiment of this invention can obtain translational displacements along two or three axes and angular displacements about one axis in spite of its extremely simple and small structure.

Figure 12:
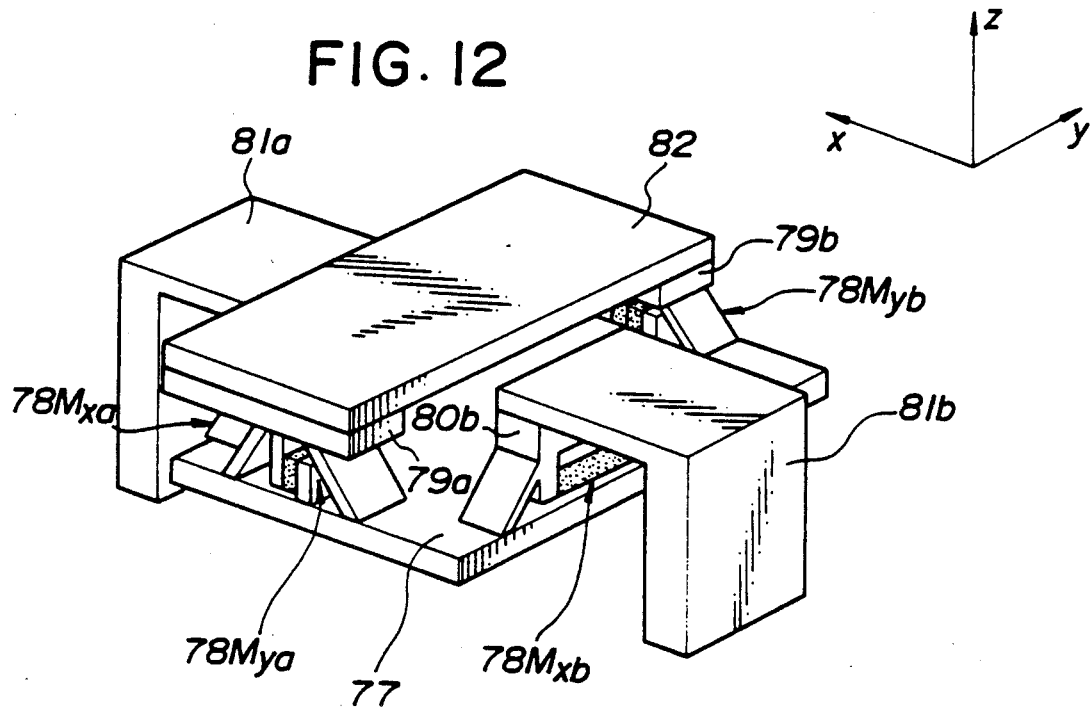
FIGS. 12 and 13 each are an exploded perspective view of a fine positioning device according to a fifth and a sixth embodiment of this invention, respectively.

FIG. 12 is an exploded perspective view of the fine positioning device according to the fifth embodiment of this invention. This embodiment has a structure equivalent to a structure which is obtained by omitting from the second embodiment the radial flexible-beam displacement mechanisms capable of producing angular displacements about the z-axis. In the drawings, x, y and z indicate respectively coordinate axes. Numerals $78M_{ya}, 78M_{yb}$ indicate respectively radial flexible-beam displacement mechanisms provided symmetrically to each other on a support plate 77. Each of the radial flexible-beam displacement mechanisms $78M_{ya}, 78M_{yb}$ produces angular displacements about the y-axis. Designated at numerals $78M_{xa}, 78M_{xb}$ are radial flexible-beam displacement mechanisms arranged symmetrically on the support plate 77. Each of the radial flexible-beam displacement mechanisms $78M_{xa}, 78M_{xb}$ produces angular displacements about the x-axis.

Designated at numerals 79a,79b are one set of rigid portions constructing the radial flexible-beam displacement mechanisms $78M_{ya}, 78M_{yb}$ (the other rigid portion being the support plate 77), while numerals 80a,80b indicate one set of rigid portions constructing the radial flexible-beam displacement mechanisms $78M_{xa}, 78M_{xb}$ (the other rigid portion being also the support plate 77). Numerals 81a,81b indicate L-shaped fixing portions connected fixedly to the rigid portions 80a,80b, while numeral 82 indicates a fine motion table fixed on the rigid portions 79a,79b. An object to be subjected to fine positioning is mounted fixedly on the fine motion table 82. The standard axes of the respective radial flexible-beam displacement mechanisms can be designed to extend on the surface of the fine motion table 82 by choosing the opening angles $\theta$ of their respective radial flexible beams.

Figure 8B:
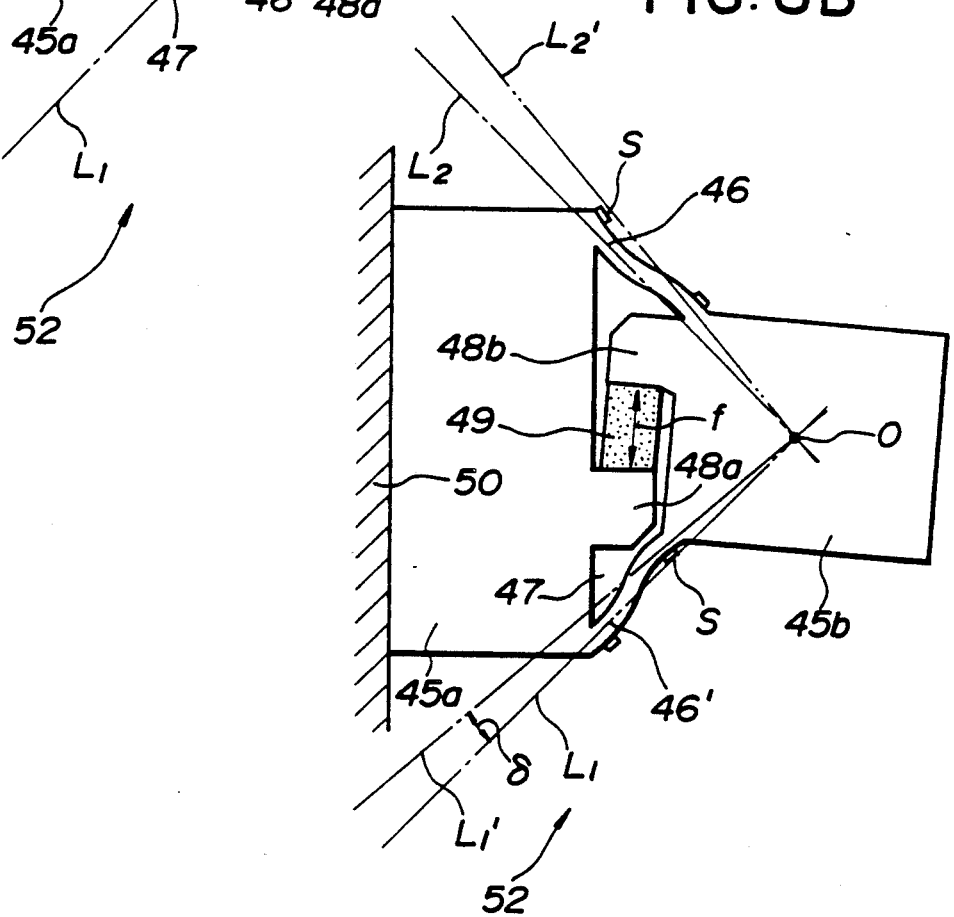

When an identical voltage is applied to each of the piezoelectric actuators of the radial flexible-beam displacement mechanisms $78M_{ya}, 78M_{yb}$, their radial flexible beams are deformed as shown in FIG. 8B. Since the support plate 77 is in a state fixed by way of fixing legs 81a,81b and radial flexible-beam displacement mechanisms $78M_{xa}, 78M_{xb}$, the radial flexible-beam displacement mechanisms $78M_{ya}, 78M_{yb}$ produce angular displacements about the y-axis so that the fine motion table 82 undergoes an angular displacement about the y-axis.

When an identical voltage is applied to each of the piezoelectric actuators of the radial flexible-beam displacement mechanisms $78M_{xa}, 78M_{xb}$ on the other hand, their radial flexible beams are deformed to produce angular displacements about the x-axis. These angular displacements are transmitted to the fine motion table 82 via the support plate 77, radial flexible-beam displacement mechanism $78M_{ya}, 78M_{yb}$, whereby the fine motion table 82 undergoes an angular displacement about the x-axis.

When the radial flexible-beam displacement mechanisms $78M_{ya}, 78M_{yb}$ and radial flexible-beam displacement mechanisms $78M_{xa}, 78M_{xb}$ are driven concurrently, the fine motion table 82 undergoes an angular displacement which is a combination of the angular displacements of the respective radial flexible-beam displacement mechanisms.

In the fifth embodiment described above, two radial flexible-beam displacement mechanisms are provided symmetrically with respect to each axis. They are however not necessarily limited to the above arrangement. One of the two sets of radial flexible-beam displacement mechanisms may be replaced by a single radial flexible-beam displacement mechanism provided centrally. If the single radial flexible-beam displacement mechanism provided centrally is not the radial flexible-beam displacement mechanism that is fixed at its fixing portions, its rigid portion serves as the fine motion table. Further, it is not essential for the y-axis and x-axis that they are present on the surface of the fine motion table. The positions of the y-axis and x-axis can be chosen as desired.

Owing to the structure described above, the fine positioning device of the fifth embodiment can obtain angular displacements about two axes in spite of its simple structure.

Figure 13:
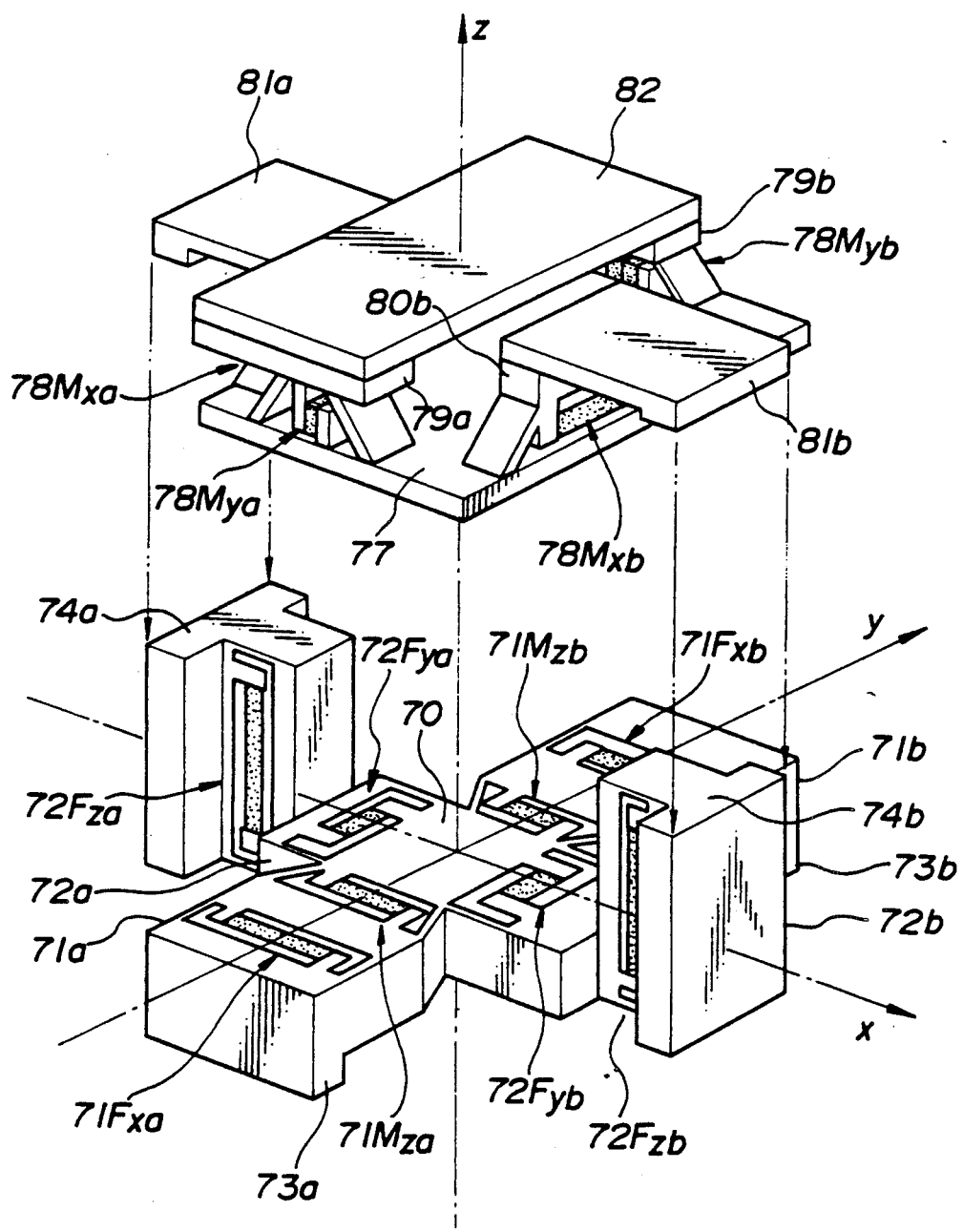

FIG. 13 is an exploded perspective view of the fine positioning device according to the sixth embodiment of this invention. The fine positioning device of the sixth embodiment has a structure equivalent to a combination of the fine positioning device of the fourth embodiment and that of the fifth embodiment. Elements either identical or equivalent to their corresponding elements shown in FIGS. 11 and 12 are identified by like reference numerals and letters and their description is omitted herein.

The connecting portions 74a,74b of the outwardly-extending portions 72a,72b and the L-shaped connecting portions 81a,81b are connected as indicated by two-dot chain lines in the drawing. As a result, the support plate 77, the radial flexible-beam displacement mechanisms $78M_{xa}, 78M_{xb}, 78M_{ya}, 78M_{yb}$ supported on the support plate 77 and the fine motion table 82 are in a state suspended over the central rigid portion 70 from the connecting portions 74a,74b,81a,81b.

By suitably choosing the opening angles of the respective flexible beams of the respective radial flexible-beam displacement mechanisms $78M_{xa}, 78M_{xb}, 78M_{ya}, 78M_{yb}, 71M_{za}, 71M_{zb}$ in the above state, their turning axes are designed to cross perpendicularly at a single point on the surface of the fine motion table 82.

The operation of the fine positioning device according to the sixth embodiment will next be described. When an identical voltage is applied to each of the piezoelectric actuators of the parallel flexible-beam displacement mechanisms $71F_{xa}, 71F_{xb}$, their parallel flexible beams are deformed along the x-axis of FIG. 13 as shown in FIG. 6B in proportion to the voltages applied, so that they produce translational displacements. These translational displacements are then transmitted to the fine motion table 82 fixed on the rigid portions 79a, 79b by way of the radial flexible-beam displacement mechanisms $71M_{za}$, $71M_{zb}$, central rigid portion 70, parallel flexible-beam displacement mechanisms $72F_{ya}, 72F_{yb}, 72F_{za}, 72F_{zb}$, connecting portions 74a, 74b, 81a, 81b, radial flexible-beam displacement mechanisms $78M_{xa}, 78M_{xb}$, support plate 77, and radial flexible-beam displacement mechanisms $78M_{ya}, 78M_{yb}$, so that the fine motion table 82 undergoes a translational displacement to a corresponding degree along the x-axis.

When an identical voltage is applied to each of the piezoelectric actuators of the radial flexible-beam displacement mechanisms $71M_{za}, 71M_{zb}$, their radial flexible beams are deformed about the z-axis of FIG. 13 as shown in FIG. 9B in proportion to the voltages applied, so that the flexible beams undergo an angular displacement. These angular displacements are transmitted to the fine motion table 82 by way of the central rigid portion 70, parallel flexible-beam displacement mechanisms $72F_{ya}, 72F_{yb}, 72F_{za}, 72F_{zb}$, connecting portions 74a, 74b, 81a, 81b, radial flexible-beam displacement mechanisms $78M_{xa}, 78M_{xb}$, support plate 77, and radial flexible-beam displacement mechanisms $78M_{ya}, 78M_{yb}$, so that the fine motion table 82 undergoes an angular displacement about the z-axis.

Similarly, when an identical voltage is applied to each of the actuators of the parallel flexible-beam displacement mechanisms $72F_{ya}, 72F_{yb}$ respectively, the fine motion table 82 undergoes a translational displacement along the y-axis. When an identical voltage is applied to each of the actuators of the parallel flexible-beam displacement mechanisms $72F_{za}, 72F_{zb}$ on the other hand, the fine motion table 82 undergoes a translational displacement along the z-axis.

When an identical voltage is applied to each of the piezoelectric actuators of the radial flexible-beam displacement mechanisms $78M_{ya}, 78M_{yb}$ respectively, angular displacements are produced about the y-axis so that the fine motion table 82 undergoes an angular displacement about the y-axis. When an identical voltage is applied to each of the piezoelectric actuators of the radial flexible-beam displacement mechanisms $78M_{xa}, 78M_{xb}$ on the other hand, the fine motion table 82 undergoes an angular displacement about the x-axis.

Both translational and angular displacements about a single axis have been described above. It is however possible to displace the fine motion table 82 as desired by choosing plural displacement mechanisms out of the respective parallel flexible-beam displacement mechanisms and radial flexible-beam displacement mechanisms and applying desired voltages thereto. In the above description of the sixth embodiment, the end portions of the outwardly-extending portions extending out along the y-axis are fixed and the connecting portions are provided at the end portions of the outwardly-extending portions extending out along the x-axis. Needless to say, it is apparent that an opposite arrangement is feasible, namely, the end portions of the outwardly-extending portions extending out along the x-axis may be fixed and the connecting portions may be provided on the leg portions of the outwardly-extending portions extending out along the y-axis. In the sixth embodiment described above, two radial flexible-beam displacement mechanisms are provided symmetrically on the support plate with respect to each axis. They are however not necessarily limited to the above arrangement. One of the two sets of radial flexible-beam displacement mechanisms may be replaced by a single radial flexible-beam displacement mechanism provided centrally. If the single radial flexible-beam displacement mechanism provided centrally is not the radial flexible-beam displacement mechanism that is fixed at its fixing portions, its rigid portion serves as the fine motion table. Further, it is not essential for each turning axis to reside on the surface of the fine motion table. The positions of the turning axes can be chosen as desired.

Owing to the structure described above, the fine positioning device of the sixth embodiment can obtain translational displacements along three axes and angular displacements about three axes in spite of its extremely simple and small structure. Since all the turning axes cross perpendicularly at one point on the surface of the fine motion table, the turning center of each angular displacement is also located on the fine motion table so that an accurate angular displacement can be effected.

The structures of several fine positioning devices making use of one or more parallel flexible-beam displacement mechanisms and/or radial flexible-beam displacement mechanisms have been described by way of example. These fine positioning devices can each produce a desired displacement with relatively high accuracy by applying a predetermined voltage to each of their piezoelectric actuators. When it is desired to obtain a displacement on the order of micrometers, it is however difficult to obtain the displacement with satisfactory accuracy if a predetermined voltage is applied simply to each of the piezoelectric actuators. Accordingly, a description will next be made of a displacement controller which enables the provision of a high-accuracy displacement by means of any one of the above-described fine positioning devices.

Since it is essential for the displacement controller to use strain gauges which have already been referred to in the above description of each fine positioning device, such strain gauges and strain outputs making use of the strain gauges will be described first of all with reference to FIGS. 14A, 14B, 15A and 15B.

Figure 14A:
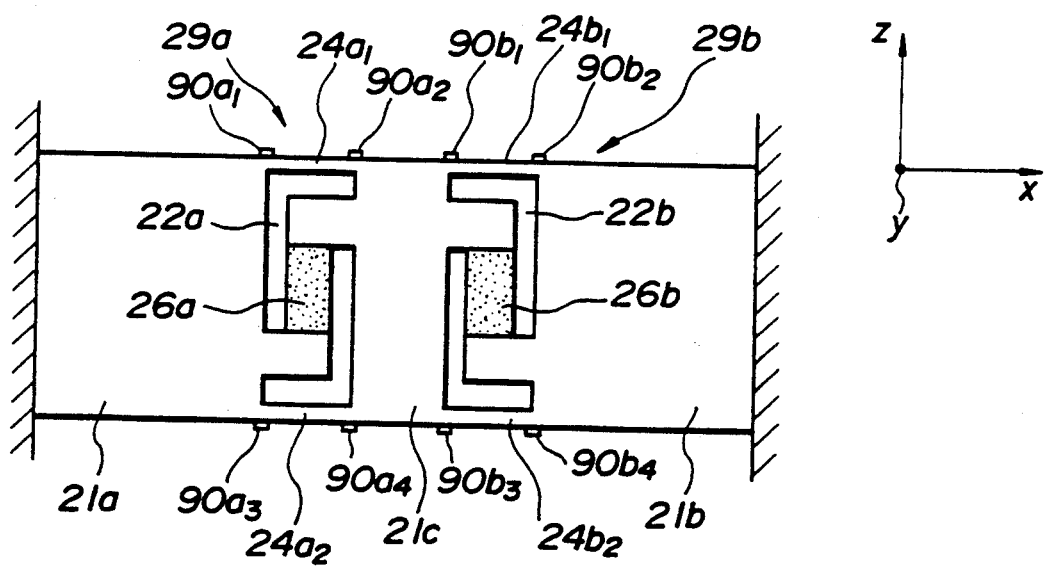
FIGS. 14A and 14B are side views of a symmetrical parallel flexible-beam displacement mechanism with strain gauges cemented thereon.
Figure 14B:
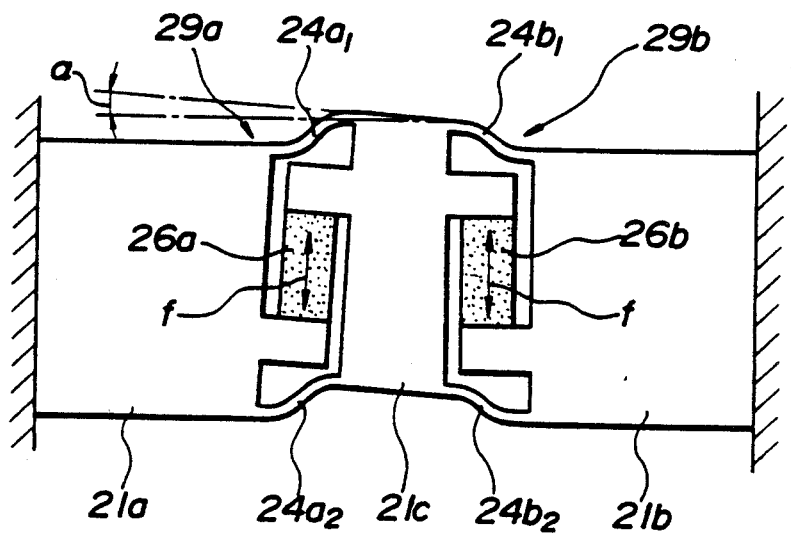

FIGS. 14A and 14B are side views of the same parallel flexible displacement mechanisms as those shown in FIGS. 6A and 6B. In FIGS. 14A and 14B, the same elements of structure as those depicted in FIG. 6A are identified by the same reference numerals or letters. Designated at numerals $90a_1, 90a_2, 90a_3, 90a_4$ are strain gauges cemented on the connecting portions between the parallel flexible beams $24a_1, 24a_2$ and the respective rigid portions $21c, 21a$ in the parallel flexible-beam displacement mechanism 29a (note: these strain gauges are indicated by letter S in FIG. 6A). On the other hand, numerals $90b_1, 90b_2, 90b_3, 90b_4$ indicate strain gauges cemented on the connecting portions between the parallel flexible beams $24b_1, 24b_2$ and the respective rigid portions 21c,21b in the parallel flexible-beam displacement mechanism 29b. The resistance of each strain gauge varies in accordance with a strain to be applied thereto.

In the parallel flexible-beam displacement mechanisms, the respective parallel flexible beams $24a_1$–$24b_2$ are flexed by application of predetermined voltages to the piezoelectric actuators 26a,26b respectively so as to produce predetermined translational displacements as already mentioned in the description of the operation in FIGS. 6A and 6B. The degrees of the displacements are proportional to the voltages applied to the piezoelectric actuators 26a,26b. When the parallel flexible beams $24a_1$–$24b_2$ are flexed on the other hand, strains are developed in the respective strain gauges so that the values of their resistances vary. It is hence possible to detect the degree of each of the parallel flexible beam $24a_1$–$24b_2$ provided that these strain gauges are formed into a suitable electric circuit.

In a symmetrical parallel flexible displacement mechanism such as that shown in FIG. 14A, it is impossible to construct both parallel flexible-beam displacement mechanisms 29a,29b completely identical to each other. Some dimensional differences are unavoidable between their corresponding portions. There are also some differences in characteristics between the piezoelectric actuators 26a and 26b. Even when an identical voltage is applied to each of the piezoelectric actuators 26a,26b respectively, the symmetrical flexible-beam displacement mechanism does not undergo such a translational displacement as shown in FIG. 6B as a matter of fact but undergoes an angular displacement toward either one of the sides as illustrated in FIG. 14B. (It should be noted that the angular displacement is shown in an extremely exaggerated fashion in FIG. 14B and the strain gauges are omitted from FIG. 14B). This angular displacement is indicated by letter $\alpha$. In other words, when an identical voltage is applied to each of the piezoelectric actuators 26a,26b respectively, a strain due to a flexural deformation of the parallel flexible beams $24a_1, 24a_2$ and that caused by a flexural deformation of the parallel flexible beams $24b_1, 24b_2$ are different in degree. If both strains are equal in degree, they are each equal to the degree of the resulting displacement of the fine positioning device. If they are different, the above-mentioned angular displacement takes place so that accurate fine positioning is no longer feasible.

With the foregoing in view, the displacement controller detects separately the degrees of strain of the parallel flexible beams $24a_1, 24a_2$ of the parallel flexible beam displacement mechanism 29a and the degrees of strain of the parallel flexible beams $24b_1, 24b_2$ of the parallel flexible beam displacement mechanism 29b and then perform a precise control in order to obtain an accurate displacement on the basis of the thus-detected data. It is hence essential for the present embodiment to have means for detecting these two degrees of strain. This means will next be described with reference to FIGS. 15A and 15B.

Figure 15A:
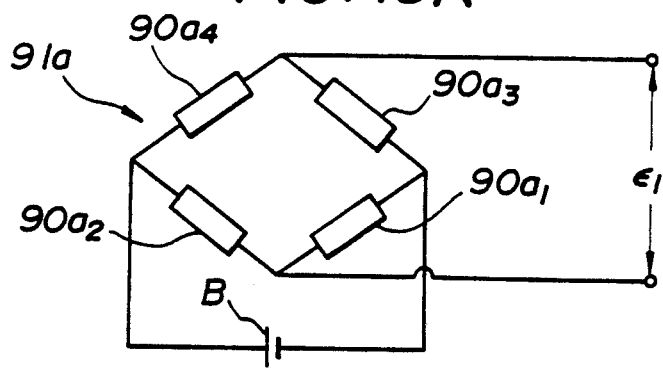
FIGS. 15A and 15B are circuit diagrams of Wheatstone bridges composed of strain gauges.
Figure 15B:
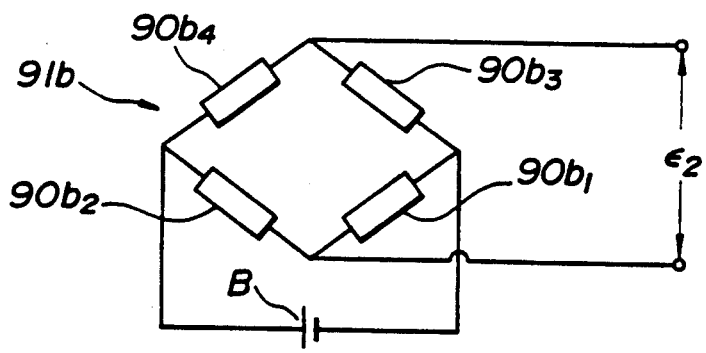

FIGS. 15A and 15B are circuit diagrams of circuits for the detection of degrees of strain. In each of the drawings, the numerals $90a_1, 90a_2, 90a_3, 90a_4, 90b_1, 90b_2, 90b_3, 90b_4$ indicate respectively the strain gauges shown in FIG. 14A. Designated at numeral 91a is a Wheatstone bridge circuit for detecting the degrees of strain of the parallel flexible beams $24a_1, 24a_2$ of the parallel flexible-beam displacement mechanism 29a, whereas numeral 91b indicates another Wheatstone bridge circuit for detecting the degrees of strain of the parallel flexible beams $24b_1, 24b_2$ of the parallel flexible-beam displacement mechanism 29b. In each of the Wheatstone bridge circuits 91a,91b, the strain gauges are connected as shown in the corresponding drawing. Letter B indicates a DC power supply.

Let's now assume that voltages are applied respectively to the piezoelectric actuators 26a,26b to produce displacements as shown in FIG. 6B. In the bridge circuit 91a, the strain gauges $90a_1, 90a_4$ are contracted while the strain gauges $90a_2, 90a_3$ are expanded. Their resistance values hence vary correspondingly. As the sum of these variations, the corresponding displacement is output as a strain value $\epsilon_1$. This also applies to the Wheatstone bridge circuit 91b, so that a strain value $\epsilon_2$ is output. In the state shown in FIG. 14B, the strain value $\epsilon_1$ is greater than the strain value $\epsilon_2$.

Figure 16:
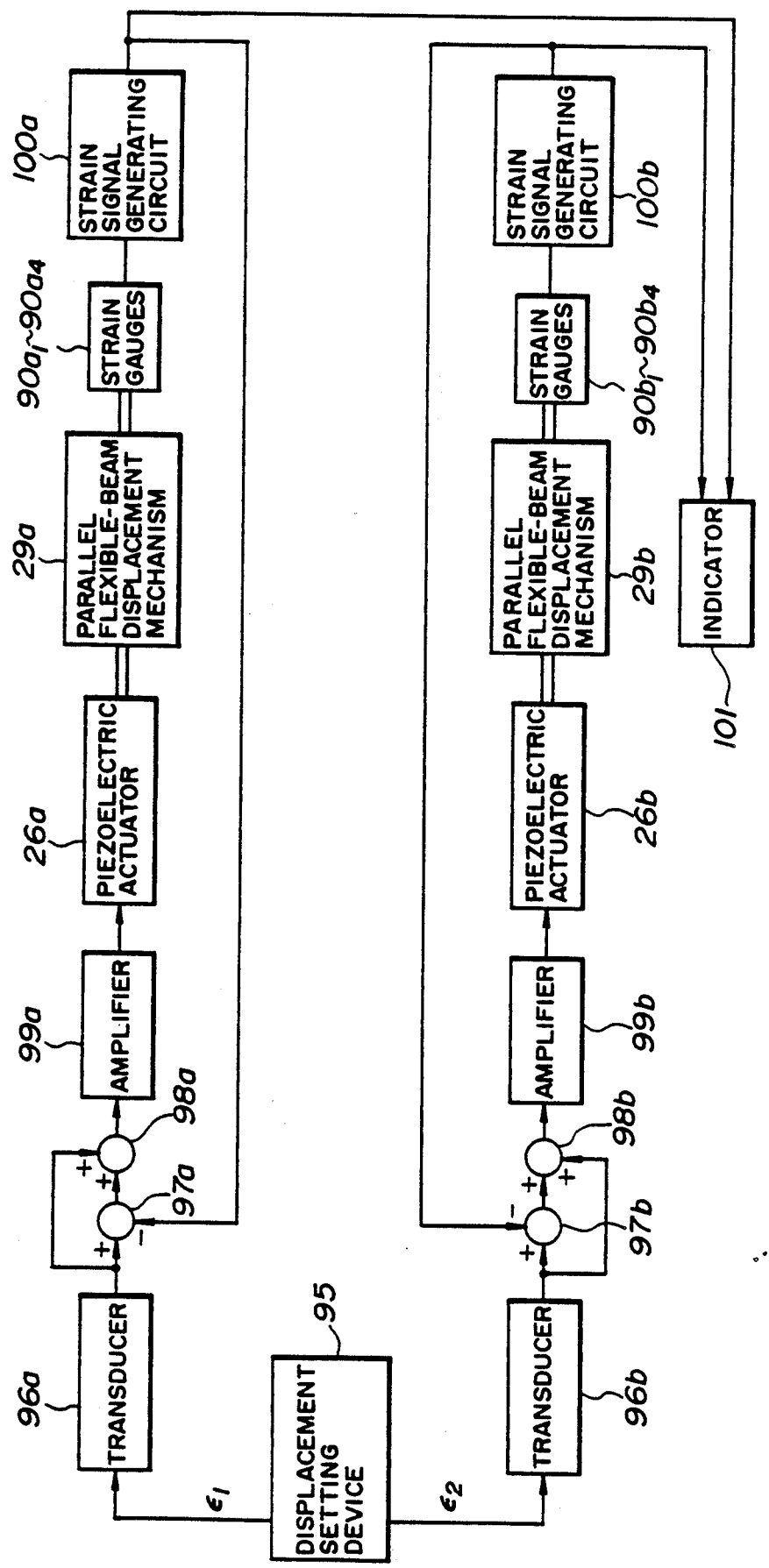
FIG. 16 is a block diagram of a displacement controller according to one embodiment of this invention.

A displacement controller for a fine positioning device making use of such strain value detection means will next be described with reference to FIG. 16. Namely, FIG. 16 is a block diagram of a displacement controller for a fine positioning device according to this invention. In the drawings, there are shown piezoelectric actuators 26a,26b, parallel flexible-beam displacement mechanisms 29a,29b, and strain gauges $90a_1$–$90a_4, 90b_1$–$90b_4$, are all the same as their corresponding elements shown in FIG. 14A.

Numeral 95 indicates a displacement setting device for setting the degree of a target displacement of the parallel flexible-beam displacement mechanisms shown in FIG. 14A. When a target displacement L is set, the displacement setting device 95 outputs strain values $\epsilon_1, \epsilon_2$ corresponding to the target displacement (see FIG. 17). Namely, different target displacements are established for a fine positioning device making use of a parallel flexible-beam displacement mechanism. A measurement is conducted in advance to determine outputs (strain values) $\epsilon_1, \epsilon_2$ from the Wheatstone bridge circuits 91a,91b whenever each of the target displacements has been achieved. The thus-measured strain values are stored in relation to their corresponding displacements in the displacement setting device 95. When the target displacement L is input to the displacement setting device 95, its corresponding strain values $\epsilon_1, \epsilon_2$ which have been measured and stored as described above are read out and then output.

Figure 17:
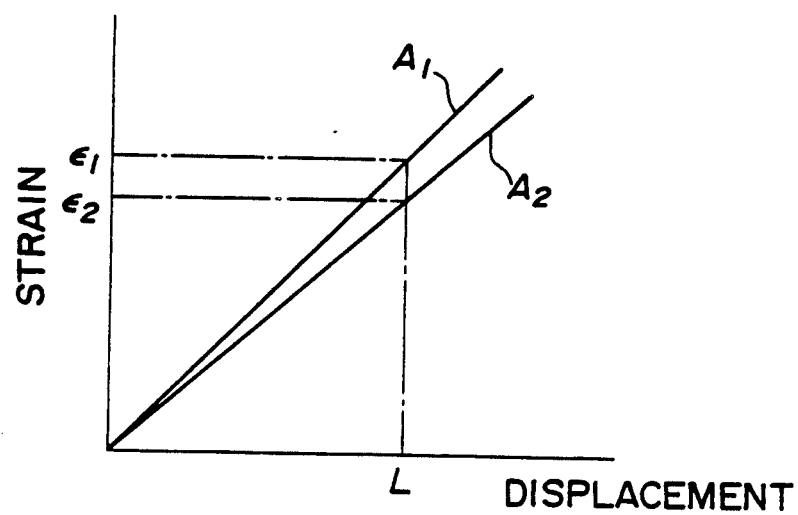
FIG. 17 is a characteristic diagram showing the relation between displacement and the strain of a strain gauge.

The relation between such strain values and displacements is shown in FIG. 17, in which displacements are plotted along the axis of abscissas while strains are plotted along the axis or ordinates. A straight line $A_1$ represents output characteristics of the Wheatstone bridge circuit 91a while a straight line $A_2$ represents output characteristics of the Wheatstone bridge circuit 91b. When the displacement is L, a strain value $\epsilon_1$ is output from the Wheatstone bridge 91a while another strain value $\epsilon_2$ is output from the Wheatstone bridge circuit 91b. In other words, the displacement L can be obtained when a voltage is applied to the piezoelectric actuator 26a so as to make the output of the Wheatstone bridge circuit 91a become the value $\epsilon_1$ and another voltage is applied at the same time to the piezoelectric actuator 26b so as to make the output of the Wheatstone bridge circuit 91b become the value $\epsilon_2$. If the relation between such displacements and strain values has already been known, it is only necessary to store their relation in the displacement setting device 95 without need for the above-described measurement.

FIG. 16 also shows transducers 96a,96b for converting (amplifying) individual strain values $\epsilon_1, \epsilon_2$ into corresponding signal voltages $v_1, v_2$ required for further processing, adders $97a, 97b, 98a, 98b$, and amplifiers $99a, 99b$. Numerals $100a, 100b$ indicate respectively strain signal generating circuits $100a, 100b$ equipped with the Wheatstone bridge circuits $91a, 91b$ and amplifier circuits for amplifying the outputs $\epsilon_{1'}, \epsilon_{2'}$ of the Wheatstone bridge circuits $91a, 91b$ into signal voltages $v_{1'}, v_{2'}$ required for processing the outputs $\epsilon_{1'}, \epsilon_{2'}$ as signals. Designated at numeral 101 is an indicator, which receives output signals from the strain signal generating circuits $100a, 100b$ and indicates a displacement of the fine positioning device on the basis of these signals.

The operation of the displacement controller will next be described. When a value is input and set in the displacement setting device 95 in order to displace the fine positioning device, which makes use of the parallel flexible-beam displacement mechanism, by the displacement L, the strain values $\epsilon_1, \epsilon_2$ corresponding to the value L are read out in the displacement setting device 95 and are then output separately from the displacement setting device 95. The strain value $\epsilon_1$ is input in the transducer 96a, in which it is converted into the signal $v_1$, followed by its input to the amplifier 99a via the adder 98a. The amplifier 99a outputs a voltage of such a level that is proportional to the input signal $v_1$ and is also suitable for driving the piezoelectric actuator 16a, and then applies the voltage to the actuator 26a. As a result, the parallel flexible beams $24a_1, 24a_2$ of the parallel flexible-beam displacement mechanism 29a are flexed and strains are caused to occur in the strain gauges $90a_1$-$90a_4$. Accordingly, the signal $v_{1'}$ proportional to the strain value $\epsilon_{1'}$ detected by the Wheatstone bridge circuit 91a is output from the strain signal generating circuit 100a. The signal $v_{1'}$ is input to the adder 97a. As a result, the difference $\Delta v$ between the signal $v_1$ and signal $v_{1'}$ is obtained. At the adder 98a, the difference $\Delta v$ and the signal $v_1$ are added together and the resultant signal $(v_1 + \Delta v)$ is input to the amplifier 99a.

A feedback control such as that described above is thereafter repeated so as to adjust voltages to be applied to the piezoelectric actuators $26a, 26b$ respectively. Eventually, the strain value $\epsilon_1$ is output from the Wheatstone bridge circuit 91a composed of the strain gauges $90a_1$-$90a_4$. Namely, the parallel flexible beams $24a_1, 24a_2$ of the parallel flexible-beam displacement mechanism 29a are flexed to the predetermined degree. Similar processing is also performed with respect to the signal $\epsilon_2$ and the strain value $\epsilon_2$ is output eventually from the Wheatstone bridge circuit 91b. As a result, the fine positioning device is allowed to undergo a displacement exactly by the target displacement L. On the other hand, signals output from the strain signal generating circuits $100a, 100b$ are input to the indicator 101, so that displacements corresponding to the signals are indicated and the displacement L is finally indicated there.

When a target displacement is set in the displacement setting device in the above-described the displacement controller, strain values corresponding to the target displacement are output and then compared respectively with the strain values from the corresponding strain signal generating circuits. Needless to say, it is possible to design the displacement controller in such a way that displacements of the respective parallel flexible-beam displacement mechanisms corresponding to a target displacement are output from the displacement setting device and displacements corresponding to strain values of the strain signal generating circuits are output from the the strain signal generating circuits.

Owing to the above construction, high-accuracy translational displacements can be practised. Since the above controller can be constructed in extremely small dimensions and at a low price, it can be provided very easily with each of the parallel flexible-beam displacement mechanisms of the fine positioning device.

In the displacement controller described above, the degree of deformation of each of the parallel flexible beams $24a_1, 24a_2, 24b_1, 24b_2$ is detected by using strain gauges. The degree of the above deformation may however be feasible by another detection means. One embodiment making use of said another detection means will hereinafter be described.

Figure 18A:
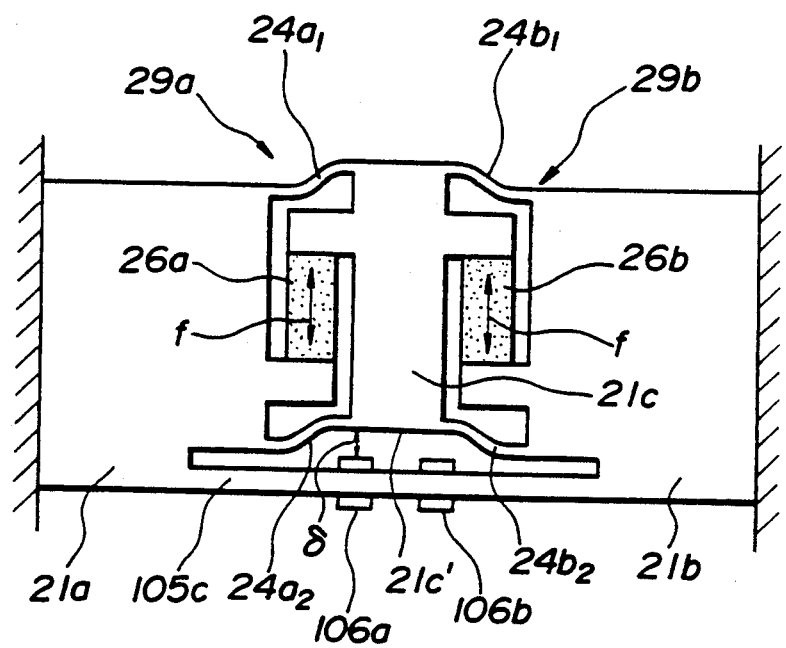
FIGS. 18A and 18B are side views of a symmetrical parallel flexible-beam displacement mechanism equipped with capacitive displacement detectors.
Figure 18B:
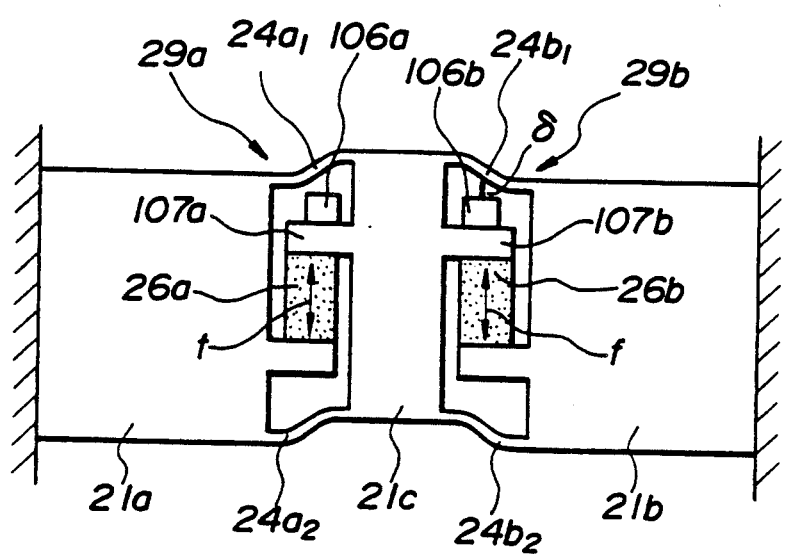

FIGS. 18A and 18B are side views of another parallel flexible-beam displacement mechanism which can be controlled by the displacement controller. Elements of structure shown in FIG. 18A identical to those depicted in FIG. 14A are identified by the same reference numerals and letters and their description is omitted herein. Numeral 105c indicates a support portion made of a rigid material. The support portion 105c is formed by extending the rigid portions $21a, 21b$ in parallel to the parallel flexible beams $24a_2, 24b_2$ and the lower wall $21c'$ of the rigid portion 21c. Designated at numerals $106a, 106b$ are capacitance displacement detectors fixed on the support portion 105c respectively. The capacitance displacement detectors $106a, 106b$ detect the spacing $\delta$ between their upper surfaces and the lower wall $21c'$. The capacitance displacement detectors $106a, 106b$ will be described subsequently.

Let's now apply a predetermined voltage to each of the piezoelectric actuators $26a, 26b$. The parallel flexible beams $24a_1, 24a_2, 24b_1, 24b_2$ are deformed as shown in FIG. 18A, whereby the lower wall $21c'$ of the rigid portion 21c undergoes an upward displacement in the drawing. The spacing $\delta$ also varies correspondingly. This varied spacing is detected by the capacitance displacement detectors $106a, 106b$. Even if the displacement is not a translational displacement but as shown in FIG. 18B, is an asymmetrical displacement containing an angular displacement, the displacement can still be detected because the values detected respectively by the capacitance displacement detectors $106a, 106b$ will be different.

The capacitance displacement detectors $106a, 106b$ can also be applied to the displacement controller depicted in FIG. 16 by using the degrees of displacements of the parallel flexible-beam displacement mechanisms $29a, 29b$ and a value detected by each of the capacitance displacement detectors $106a, 106b$ provided that when a desired displacement is set in the displacement setting device 95 shown in FIG. 16, the corresponding displacements of the parallel flexible-beam displacement mechanisms $29a, 29b$ are output respectively.

FIG. 18B is a side view of the parallel flexible-beam displacement mechanism in which the points of attachment of the capacitance displacement detectors are different from those depicted in FIG. 18A. Elements of structure identical to those shown in FIG. 18A are identified by the same reference numerals and letters. The capacitance displacement detectors $106a, 106b$ are fixed respectively on the upper surfaces of holding portions $107a, 107b$ which extend inwardly from the rigid portion 21c and hold the piezoelectric actuators $26a, 26b$ thereon. The capacitive displacement detectors $106a, 106b$ are located at positions facing the parallel flexible beams $24a_1, 24b_1$ respectively. When the parallel flexible beams $24a_1, 24b_1$ are deformed, the capacitance displacement detectors 106a,106b detect the spacing δ therebetween. Similar to the parallel flexible-beam displacement mechanism shown in FIG. 18A, this parallel flexible-beam displacement mechanism can be applied to the displacement controller depicted in FIG. 16.

Figure 19A:
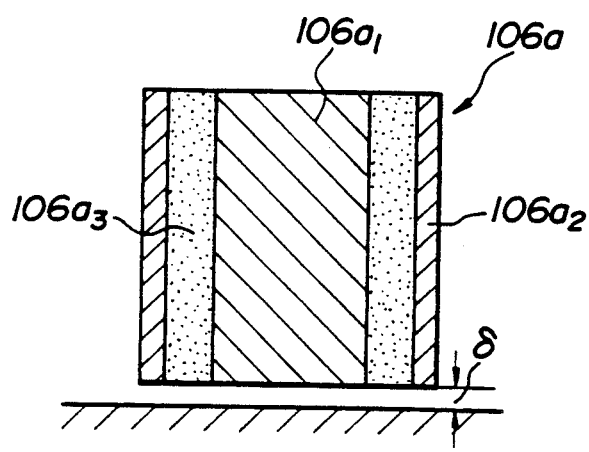
FIGS. 19A, 19B and 19C are a side view, plan view and circuit diagram of a capacitive displacement detector respectively.
Figure 19B:
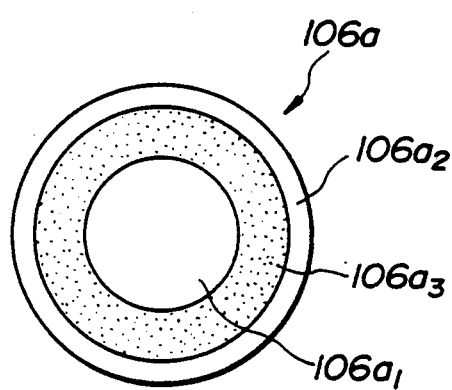
Figure 19C:
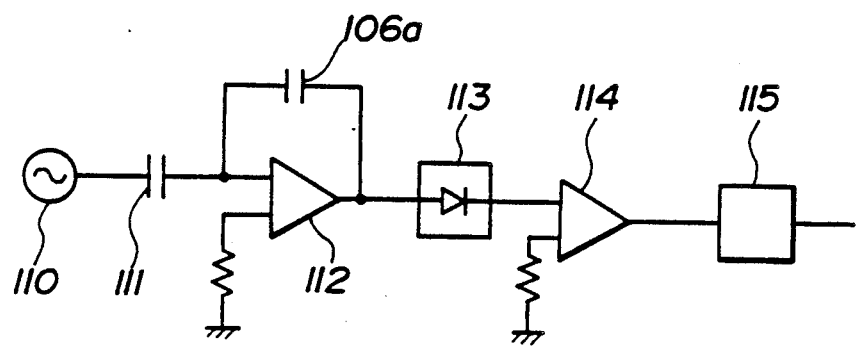

The structure and detection circuit of these capacitance displacement detector 106a,106b will next be described in brief. FIGS. 19A and 19B are a cross-sectional view and bottom view of a capacitance displacement detector, while FIG. 19C is a circuit diagram of the detection circuit. A description will hereinafter be made of the capacitance displacement detector 106a alone. In FIGS. 19A and 19B, designated at numeral 106a₁ is a columnar central electrode while the numeral 106a₂ indicates a cylindrical electrode facing the circumferential wall of the central electrode 106a₁. Designated at numeral 106a₃ is a dielectric interposed between the central electrode 106a₁ and cylindrical electrode 106a₂. The central electrode 106a₁ and cylindrical electrode 106a₂ are constructed to have an identical horizontal cross-sectional area as viewed in FIG. 19B.

The electrostatic capacity $C_a$ between the central electrode 106a₁ and cylindrical electrode 106a₂ is represented by the following equation:

$$C_a = \epsilon S/\delta$$

where

- δ: Spacing between the lower surface of the capacitance displacement detector 106a and the opposing surface.
- S: Cross-sectional area of the central electrode 106a₁ and cylindrical electrode 106a₂.
- ε: Dielectric constant of the dielectric.

Therefore, the spacing δ can be detected by measuring the electrostatic capacity $C_a$ of the capacitance displacement detector 106a.

This electrostatic capacity $C_a$ is detected by the detection circuit shown in FIG. 19c, in which there are shown an oscillator 110, a capacitor 111 giving a standard electrostatic capacity $C_Y$, an AC amplifier 112, the capacitance displacement detector 106a, an AC/DC converter 113, a DC amplifier 114, and a low-pass filter 115.

When the electrostatic capacity $C_a$ of the capacitance displacement detector 106a is amplified by the AC amplifier 112, the output $e_a$ of the AC amplifier 112 is expressed by the following equation:

$$e_a = -e_{ex} C_Y/C_a$$

wherein $e_{ex}$: signal of a predetermined frequency and voltage from the oscillator 110. This signal is converted to a direct current by the AC/DC converter 113, is subjected to a span adjustment at the DC amplifier 114 and is then shaped at the low-pass filter 115. Consequently, the signal $e_a$ is expressed as follows:

$$e_a = \frac{-e_{ex} \cdot C_y}{\epsilon S} \cdot \delta$$

The signal $e_a$ is hence output as a detection signal of the spacing δ. Namely, the spacing δ can be detected by the capacitance displacement detector 106a.

In the displacement controller described above, the fine positioning device capable of performing translational displacements is referred to by way of example. It is however apparent that the controller of this invention can also be applied to the fine positioning device depicted in FIG. 9A which can perform angular displacements.

Owing to the above-described construction, the above displacement controller can perform a high-accuracy displacement control and can be constructed in small dimensions and at a low price. It can therefore be provided easily with each fine positioning device.

The above displacement controller for the fine positioning device has such a construction that a feedback control is effected by detecting translational displacements of both parallel flexible displacement mechanisms of the symmetrical type. Another displacement controller may also be contemplated that in addition to the above-mentioned displacement control, the degree of a strain caused by translational displacement components of both parallel flexible-beam displacement mechanisms and the degree of a strain caused by an angular displacement (the angle α shown in FIG. 14B) are detected separately and an accurate displacement control is effected based on these detected values. A displacement controller according to another embodiment of control similar to the aforementioned embodiment will next be described.

In this displacement controller, the detection of each strain value is conducted by a Wheatstone bridge circuit like the above-described displacement controller. Reflecting differences in the manner of control, different detection means are employed for the detection of the degree of each strain. The strain detection means in this displacement controller will be described first of all.

Figure 20A:
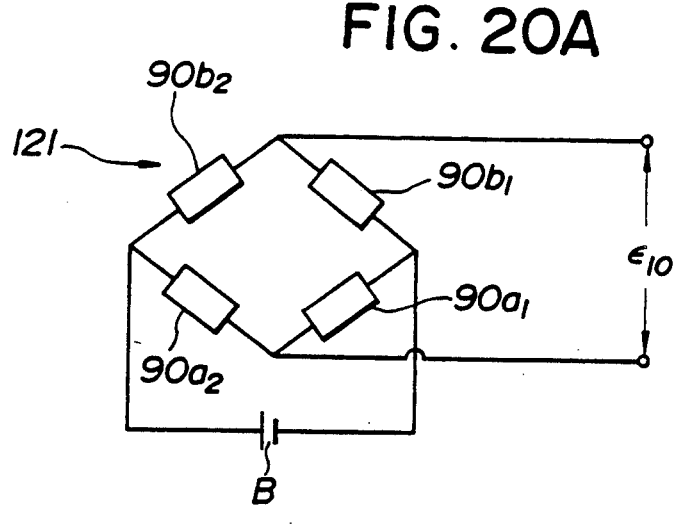
FIGS. 20A and 20B are circuit diagrams of Wheatstone bridges composed of strain gauges respectively.
Figure 20B:
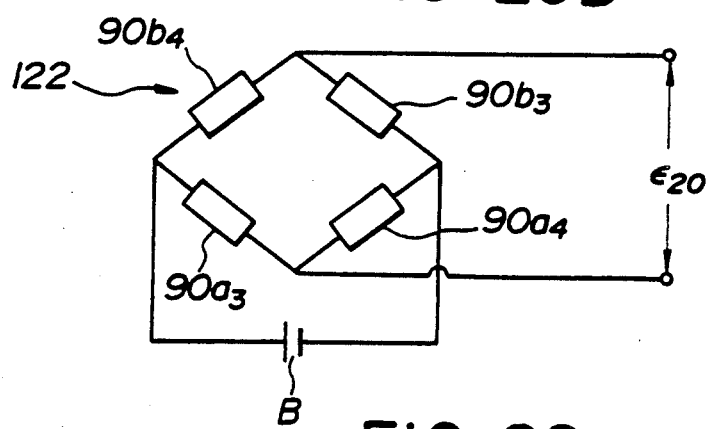

FIGS. 20A and 20B are circuit diagrams of strain value detection circuits respectively. In both drawings, numerals 90a₁,90a₂,90a₃,90a₄,90b₁,90b₂,90b₃, 90b₄ are respectively strain gauges shown in FIG. 14A. There are also shown a Wheatstone bridge circuit 121 for detecting the degree of each strain by translational displacements of the parallel flexible-beam displacement mechanisms 29a,29b and another Wheatstone bridge circuit 122 for detecting the degree of each strain by angular displacements of the parallel flexible-beam displacement mechanisms 29a,29b. In each of the Wheatstone bridge circuits 121,122, the individual strain gauges are connected as shown in the corresponding drawing. Letter B indicates a DC power supply.

Let's now assume that the piezoelectric actuator 26a,26b are each applied with a voltage and displacements are caused to occur as shown in FIG. 6B. In the Wheatstone bridge circuit 121, the strain gauges 90a₂,90b₁ contract and the strain gauges 90a₁,90b₂ expand and their resistance values hence vary correspondingly. The displacements are then output as a strain value $\epsilon_{10}$. The displacements are therefore output as the sum of these variations, i.e., as a strain value $\epsilon_{10}$. In the Wheatstone bridge circuit 122, the strain gauges 90a₄,90b₃ contract while the strain gauges 90a₃,90b₄ expand. A strain value $\epsilon_{20}$ is hence output in such a form that their changes in resistance are cancelled each other. In the state shown in FIG. 6B, the strain value $\epsilon_{20}$ is 0. In the state shown in FIG. 14B on the other hand, the strain value $\epsilon_{20}$ is not 0 because an angular displacement is contained. In the subsequent description, the strain value $\epsilon_{20}$ in such a state as mentioned above will be considered to be positive while the strain value $\epsilon_{20}$ of rotary displacement in the opposite direction will be assumed to be negative.

Figure 21:
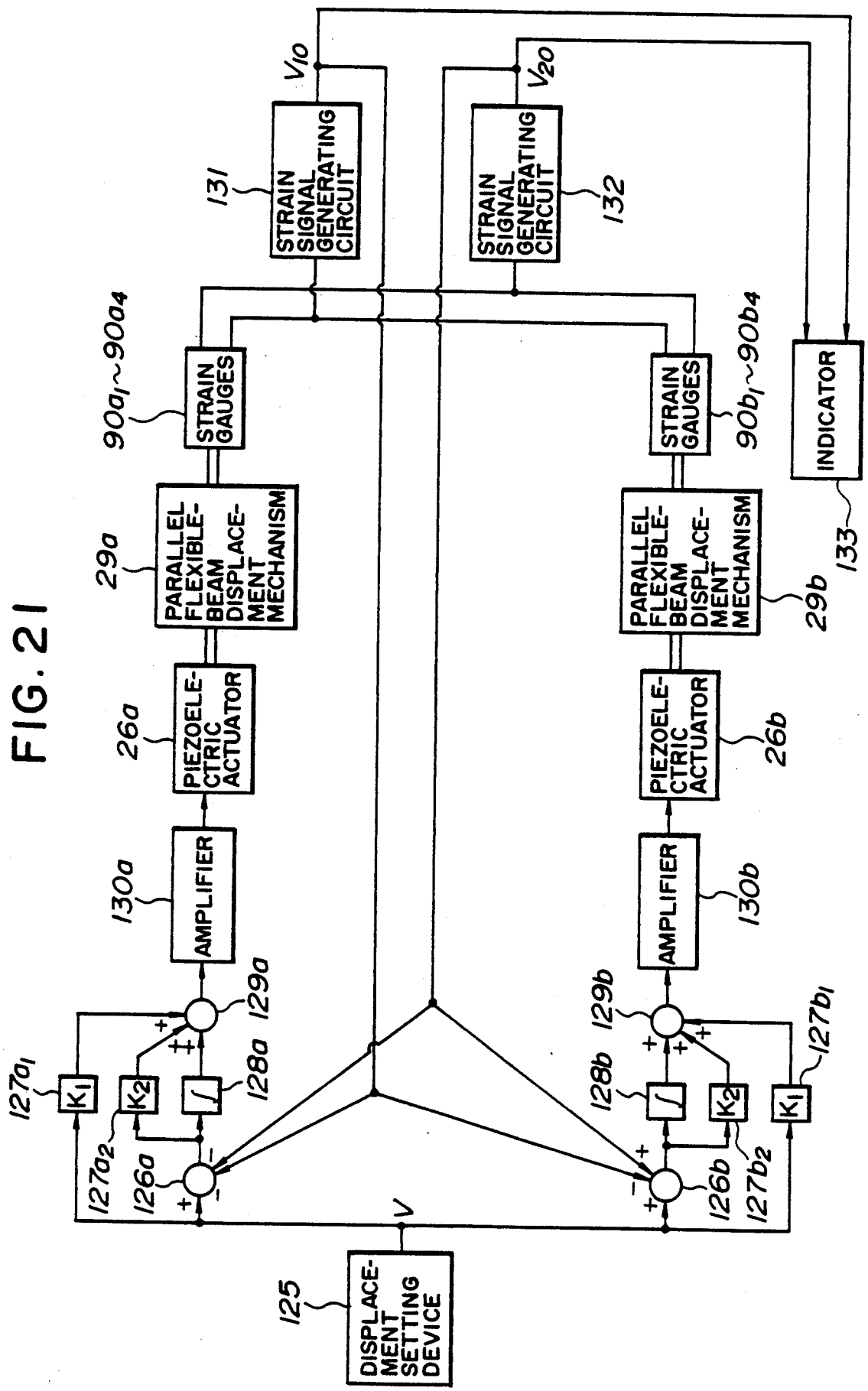
FIG. 21 is a block diagram of a displacement controller according to another embodiment of this invention.

Another displacement controller making use of such strain value detection means is now described. FIG. 21 is a block diagram of another displacement controller according to this invention, which is suitable for use with a fine positioning device. In the drawing, there are shown piezoelectric actuators 26a,26b, parallel flexible-beam displacement mechanisms 29a,29b, and strain gauges $90a_1$-$90a_4$,$90b_1$-$90b_4$. They are identical to their corresponding elements shown in FIG. 14A.

Designated at numeral 125 is a displacement setting device for setting the degree of a target displacement of the parallel flexible-beam displacement mechanism depicted in FIG. 14A. When a target displacement L is set, the displacement setting device 125 outputs a value V which is proportional to the above-described strain value $\epsilon_{10}$ corresponding to the target displacement L. In other words, different target displacements are established for the above fine positioning device. A measurement is conducted in advance to determine an output (strain value) $\epsilon_{10}$ from a Wheatstone bridge circuit 121 whenever each of the target displacements has been achieved. The thus-measured values V are stored in relation to the respective strain values in the displacement setting device 125. When the target displacement L is input, the displacement setting device 125 reads out the corresponding stored value V and outputs same. When the characteristics of the degree of displacements and strain values have already been known, it is only necessary to store the above characteristics in the displacement setting device 125 without need for the above-described measurement.

There are also depicted adders 126a,126b, gain controllers $127a_1$,$127a_2$,$127b_1$,$127b_2$, integrators 128a,128b, and adders 129a,129b. In the feedback control system making use of differential voltages (to be described subsequently) output from the adders 126a,126b respectively, the gain controllers $127a_1$, $127a_2$,$127b_1$,$127b_2$ and integrators 128a,128b serve to change the size of feedback signals per unit time. They have such a function that the hunting problem of the control system is prevented by adjusting the level of the gain of each of the gain controller $127a_1$-$128b_2$, thereby avoiding positional deviation and achieving the prompt displacement to the target position. Designated at numerals 130a,130b are amplifiers which amplify in proportion to the voltage V the outputs of the adders 129a,129b to the drive levels of the corresponding piezoelectric actuators 26a,26b respectively.

Numeral 131 indicates a strain signal generating circuit which includes the Wheatstone bridge circuit 121 and amplifies the output $\epsilon_{10}$ of the Wheatstone bridge circuit 131 to a voltage of a predetermined level. The output of the strain signal generating circuit 131 is indicated by a value $V_{10}$. On the other hand, the numeral 132 indicates another strain signal generating circuit which includes the Wheatstone bridge circuit 122 and amplifies the output $\epsilon_{20}$ of the Wheatstone bridge circuit 122 to a voltage of a predetermined level. The output of the strain signal generating circuit 132 is indicated by a value $V_{20}$. Designated at numeral 133 is an indicator for indicating the degree of a displacement on the basis of its corresponding outputs from the strain signal generating circuits 131,132.

The operation of the above embodiment will next be described. When the value L is input and set in the displacement setting device 125 in order to make the parallel flexible-beam displacement mechanism shown in FIG. 14A undergo a displacement L, the voltage which is proportional to the strain value $\epsilon_{10}$ corresponding to the displacement L is output from the displacement setting device 125. This voltage is then input to the amplifier 130a via the adder 126a, gain controllers $127a_1$,$127a_2$, integrator 128a and adder 129. The amplifier 130a then generates a voltage the level of which is proportional to the signal input to the amplifier 130a and is suitable for driving the piezoelectric actuator 26a. The voltage is thereafter applied to the piezoelectric actuator 26a. As a result, the flexible beams $24a_1$,$24a_2$ of the parallel flexible-beam displacement mechanism 29a are flexed and a strain is correspondingly developed in each of the strain gauges $90a_1$-$90a_4$. Similarly, the voltage V output from the displacement setting device 125 is also amplified at the amplifier 130b. The thus-amplified voltage then drives the piezoelectric actuator 26b, so that the flexible beams $24b_1$,$24b_2$ of the parallel flexible-beam displacement mechanism 29b are flexed and a strain is hence developed in each of the strain gauges $90b_1$-$90b_4$.

The strain gauges $90a_1$,$90a_2$,$90b_1$,$90b_2$ are connected to the strain signal generating circuit 131 in such a way that the strain gauges form the Wheatstone bridge circuit 121 depicted in FIG. 20A. As a result of strain of each of these strain gauges, a strain value $\epsilon_{10}$ corresponding to a translational displacement is detected. The strain value $\epsilon_{10}$ is then amplified to the signal $V_{10}$ which is proportional to the strain value, and the signal $V_{10}$ is output from the strain signal generating circuit 131. On the other hand, the strain gauges $90a_3$,$90a_4$, $90b_3$,$90b_4$ are connected to the strain signal generating circuit 132 in such a way that the strain gauges form the Wheatstone bridge circuit 122 depicted in FIG. 20B. A strain value $\epsilon_{20}$ corresponding to an angular displacement is detected. The amplified signal $V_{20}$ is then output.

The signal $V_{10}$ from the strain signal generating circuit 131 is input to each of the adder 126a,126b, where the signal is added to the signal V so as to obtain their difference $(V-V_{10})$. On the other hand, the signal $V_{20}$ from the strain signal generating circuit 132 is input to each of the adders 126a,126b. Let's now assume that the parallel flexible-beam displacement mechanism is in the state shown in FIG. 14B. Then, the output $\epsilon_{20}$ of the Wheatstone bridge circuit 122 depicted in FIG. 20B, namely, the signal $V_{20}$ takes a positive value. In this case, the displacement of the parallel flexible-beam displacement mechanism 29a is large and that of the parallel flexible-beam displacement mechanism 29b is small. It is hence necessary to conduct a control in such a way that the a lower voltage is applied to the piezoelectric actuator 26a and a higher voltage is applied to the piezoelectric actuator 26b. Therefore, the signal $V_{20}$ is subtracted at the adder 126a while the signal $V_{20}$ is added at the adder 126b. As a consequence, the output from the adder 126a has such a value that it decreases the displacement of the parallel flexible-beam displacement mechanism 29a but increases the displacement of the parallel flexible-beam displacement mechanism 29b.

Values, which have been obtained separately by reducing and increasing the target value V by the above-mentioned difference at the adders 129a,129b, are input to the amplifiers 130a,130b respectively. By repeating the above-described operation, the voltage $V_{10}$ proportional to the output $\epsilon_{10}$ of the Wheatstone bridge circuit 121 is eventually coincided with the output voltage V of the displacement setting device 125 and the output $\epsilon_{20}$ of the Wheatstone bridge circuit 122 is finally reduced to 0, whereby the intended translational displacement can be obtained with high accuracy.

As an alternative, it is feasible to construct a Wheatstone bridge circuit for detecting angular displacements by the strain gauges $90a_1, 90a_2, 90b_1, 90b_2$ and another Wheatstone bridge circuit for detecting translational displacements by the strain gauges $90a_3, 90a_4, 90b_3, 90b_4$.

Owing to the above-described construction, the displacement controller of this embodiment can obtain high-accuracy translational displacements like the displacement controller of the preceding embodiment. Since the displacement controller can be formed at a low price into extremely small dimensions, it can be provided with each parallel flexible-beam displacement mechanism.

Two displacement controllers for parallel flexible-beam displacement mechanisms have been described above. A displacement controller for producing angular displacements only in a radial flexible-beam displacement mechanism may also be constructed in substantially the same manner as the preceding displacement controllers. Such a displacement controller will hereinafter be described. A description will however be made first of all of radial flexible-beam displacement mechanisms, strain gauges applied to the mechanisms and strain value detection means, because strain values are detected by Wheatstone bridge circuits making use of the strain gauges and displacements are controlled on the basis of the strain values thus detected.

Figure 22:
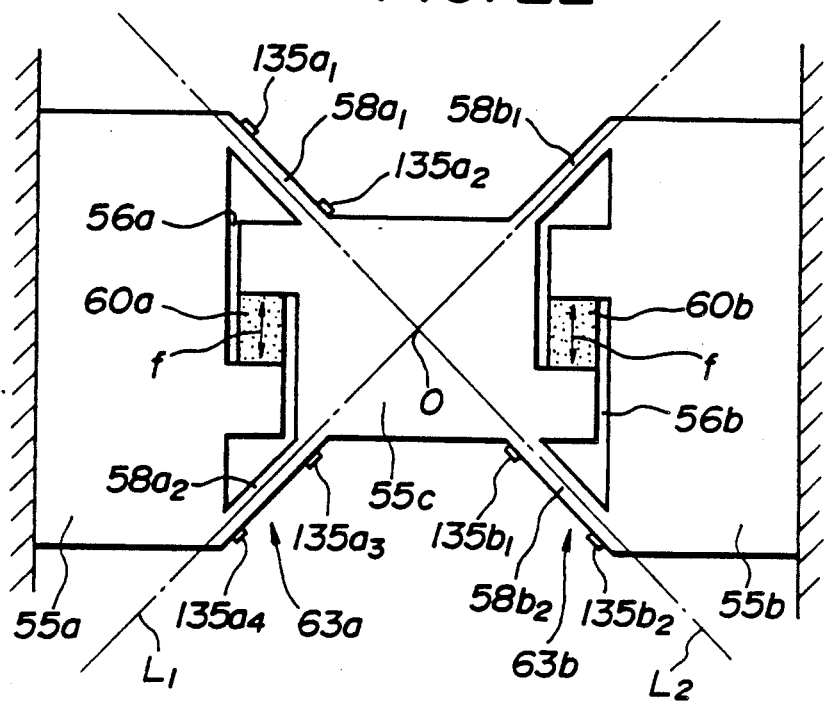
FIG. 22 is a side view of a symmetrical radial flexible-beam displacement mechanism with strain gauges cemented thereon.

FIG. 22 is a side view of the same radial flexible-beam displacement mechanism as that shown in FIG. 9A. Elements of structure identical to their corresponding elements depicted in FIG. 9A are identified by like reference numerals and letters. Designated at numerals $135a_1, 135a_2$ are strain gauges cemented on the radial flexible beam $58a_1$. Numerals $135a_3, 135a_4$ indicate strain gauges cemented on the radial flexible beam $58a_2$, while numerals $135b_1, 135b_2$ indicate strain gauges cemented on the radial flexible beam $58b_2$.

When a predetermined voltage is applied to each of the piezoelectric actuators $60a, 60b$, each of the radial flexible beams $58a_1$-$58b_2$ is flexed to produce a predetermined angular displacement. The degree of this angular displacement is proportional to the voltage applied to each of the piezoelectric actuators $60a, 60b$. When the radial flexible beam $58a_1$-$58b_2$ are flexed, a strain is developed in each of the strain gauges $135a_1$-$135b_2$ so that the resistance of each strain gauge changes. It is hence possible to determine the degree of strain of each of the radial flexible beams $58a_1$-$59b_2$ by using these strain gauges $135a_1$-$135b_2$.

For the same reasons as mentioned above in the preceding embodiment, it is usually impossible to obtain a perfect angular displacement in the above fine positioning device. In the angular displacement depicted in FIG. 9B, translational displacements are also involved along the x- and z-axes in many instances although the degrees of such translational displacements are small. Similar to the preceding displacement controller, a control is also effected in this displacement controller by detecting a strain value caused by an angular displacement and a strain value caused by translational displacements along the x- and z-axes respectively and then reducing the strain value related to the translational displacements to 0. Strain value detecting means required for the above control are shown in FIGS. 23A–23C respectively.

Figure 23A:
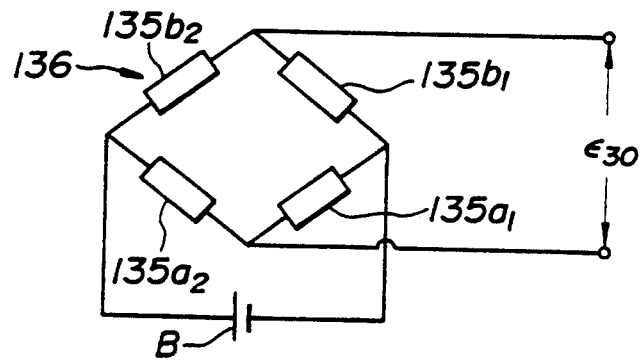
FIGS. 23A, 23B and 23C are circuit diagrams of Wheatstone bridges composed of strain gauges respectively.
Figure 23B:
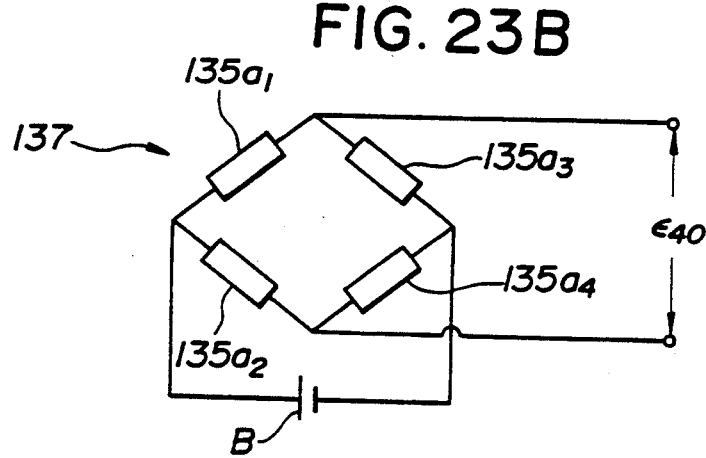
Figure 23C:
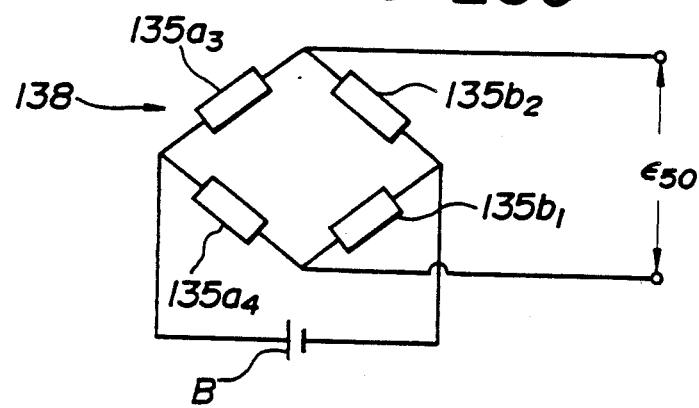

FIGS. 23A–23C are circuit diagrams of such strain value detection circuits respectively. FIG. 23A shows a Wheatstone bridge circuit 136 for detecting a strain value $\epsilon_{30}$ due to each angular displacement, FIG. 23B illustrates a Wheatstone bridge circuit 137 for detecting a strain value $\epsilon_{40}$ due to each translational displacement along the x-axis, and FIG. 23C depicts a further Wheatstone bridge circuit 138 for detecting a strain value $\epsilon_{50}$ due to each translational displacement along the z-axis. Obviously, the Wheatstone bridge circuits 136, 137, 138 can be formed by cementing their respective four strain gauges $135a_1$-$135b_4$.

Figure 24:
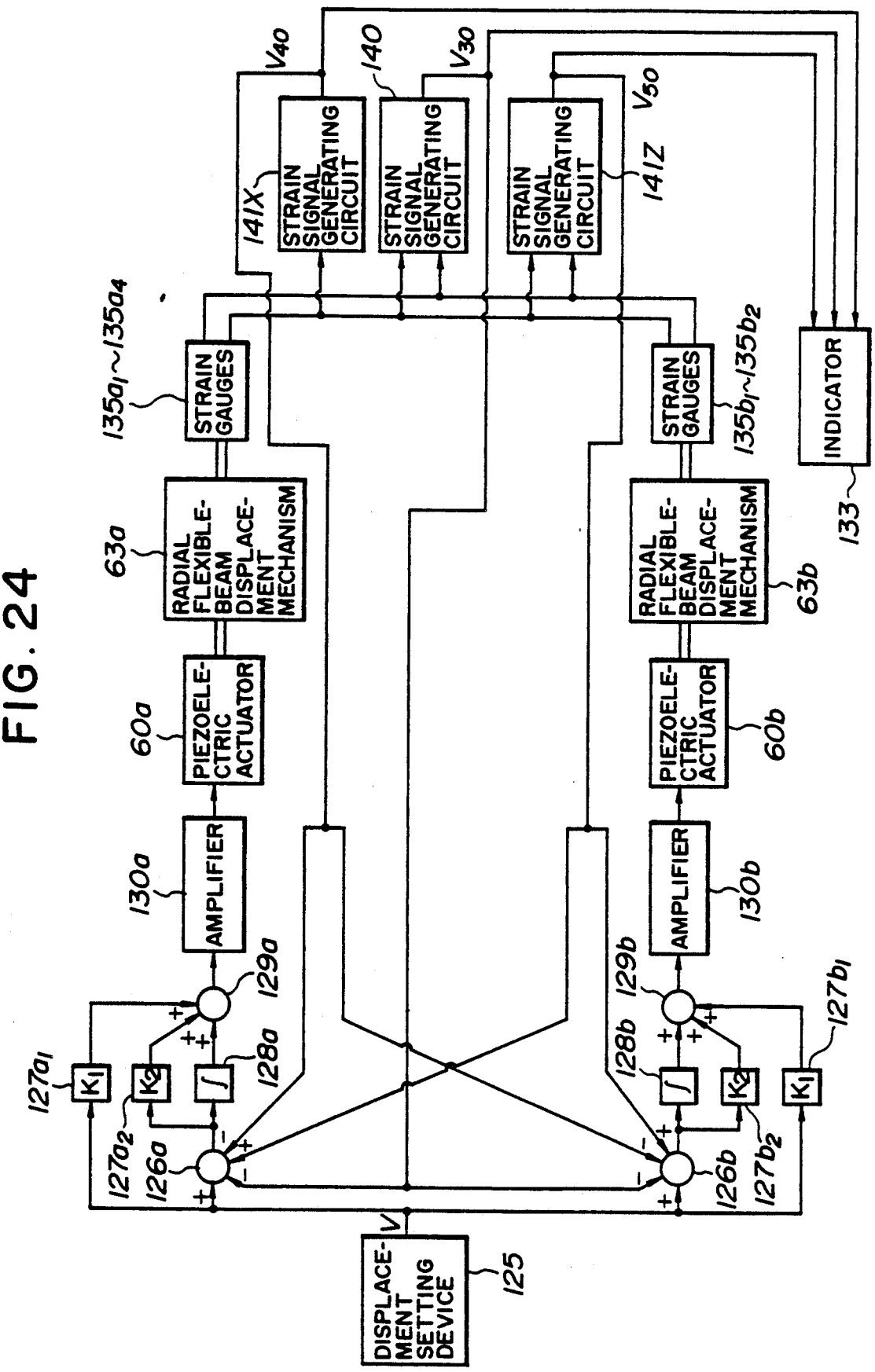
FIG. 24 is a block diagram of a displacement controller according to a further embodiment of this invention.

A displacement controller making use of the above-described strain value detection means is now described. FIG. 24 is a block diagram of the displacement controller, in which elements of structure identical to their corresponding elements in FIG. 21 are identified by like reference numerals and letters. Description of such like elements of structure is omitted herein. It should however be noted that the displacement setting device 125 serves to set angular displacements. Designated at numerals $60a, 60b$ are the piezoelectric actuators shown in FIG. 22, while the radial flexible-beam displacement mechanisms shown in FIG. 22 are designated at numerals $63a, 63b$ respectively. The strain gauges illustrated in FIG. 22 are indicated at numerals $135a_1$-$135b_4, 135b_1, 135b_2$ respectively. Designated at numerals 140, 141x and 141z are strain signal generating circuits, which are equivalent to the strain signal generating circuits 131, 132 illustrated in FIG. 21. The strain signal generating circuit 140 includes the Wheatstone bridge circuit 136 shown in FIG. 23A, the strain signal generating circuit 141x includes the Wheatstone bridge circuit 137 shown in FIG. 23A, and the strain signal generating circuit 141z includes the Wheatstone bridge circuit 138 shown in FIG. 23C.

In this displacement controller, the drive and control of the radial flexible-beam displacement mechanism $63a$ is performed by a loop which runs through the adder $126a$, gain controllers $127a_1, 127a_2$, integrator $128a$, adder $129a$, amplifier $130a$, piezoelectric actuator $60a$, radial flexible-beam displacement mechanism $63a$, strain gauges $135a_1$-$135a_4, 135b_1, 135b_2$, and strain signal generating circuits 140, 141x, 141z. On the other hand, the drive and control of the radial flexible-beam displacement mechanism $63b$ is performed by a loop which runs through the adder $126b$, gain controllers $127b_1, 127b_2$, integrator $128b$, adder $129b$, amplifier $130b$, piezoelectric actuator $60b$, radial flexible-beam displacement mechanism $63b$, strain gauges $35a_1$-$135a_4, 135b_1, 135b_2$ and strain signal generating circuits 140, 141x, 141z. By these controls, the output $V_{40}$ of the strain signal generating circuit 141x and the output $V_{50}$ of the strain signal generating circuit 141z are both controlled to 0, in other words, the translational displacements along the x- and z-axes contained in the angular displacement are eliminated and at the same time, the output $V_{30}$ of the strain signal generating circuit 140 is brought into conformity with the output V of the displacement setting device 125. This operation of the displacement controller is similar to that of the preceding displacement controller and its detailed description is omitted herein.

Owing to the above-described construction, the displacement controller of this embodiment can obtain high-accuracy angular displacements. Since the displacement controller can be formed at a low price into extremely small dimensions, it can be provided easily with each radial flexible-beam displacement mechanism.

Figure 25:
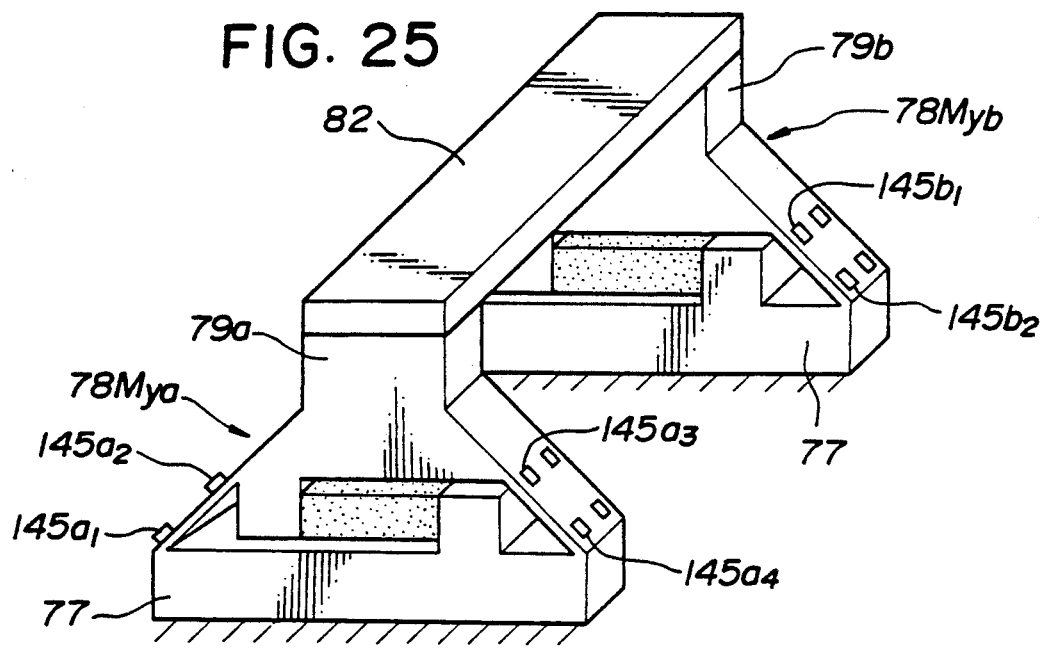
FIG. 25 is a perspective view of a fine positioning device making use of two radial flexible-beam displacement mechanisms.

In the above description of the displacement controller, the displacement controller is applied to the symmetrical radial flexible-beam displacement mechanism. However, the above displacement controller can also be applied to an asymmetrical radial flexible-beam displacement mechanism. This will next be described in brief with reference to the radial flexible-beam displacement mechanisms of the fine positioning device of FIG. 12 by way of example. FIG. 25 is a perspective view of the radial flexible-beam displacement mechanisms $78M_{ya}, 78M_{yb}$ taken out solely from the fine positioning device depicted in FIG. 12. In FIG. 25, elements of structure identical to their corresponding elements in FIG. 12 are identified by like reference numerals and letters and their description is omitted herein. Designated at numerals $145a_1$-$145b_2$ are strain gauges cemented respectively at illustrated positions on the respective radial flexible-beam displacement mechanisms $78M_{ya}, 78M_{yb}$.

Like the symmetrical radial flexible-beam displacement mechanism shown in FIG. 22, it is also difficult to make each of the radial flexible-beam displacement mechanisms $78M_{ya}, 78M_{yb}$ undergo an identical angular displacement in the radial flexible-beam displacement mechanism of the above-described construction. The fine motion table 82 is obviously unable to undergo a perfect angular displacement but is subjected to a twisting deformation, unless the angular displacements of the radial flexible-beam displacement mechanisms $78M_{ya}, 78M_{yb}$ are identical to each other. It is hence necessary to control the radial flexible-beam displacement mechanisms in such a way that the angular displacement is controlled to the target value and the displacement due to the twisting deformation is reduced to 0. Means for detecting strain values caused respectively by angular displacements and twisting deformations, which are required for the above-mentioned control, will next be described with reference to FIGS. 26A and 26B.

Figure 26A:
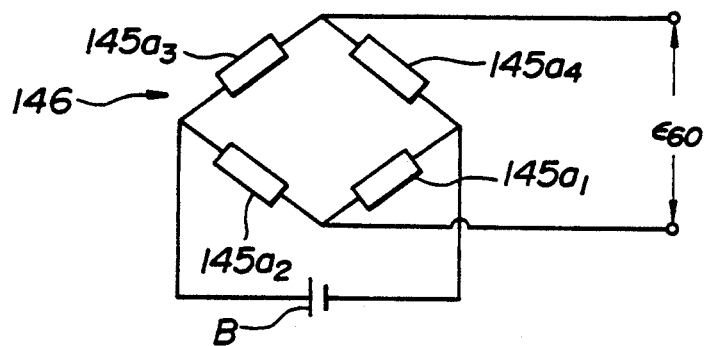
FIGS. 26A and 26B are circuit diagrams of Wheatstone bridges composed of strain gauges respectively.
Figure 26B:
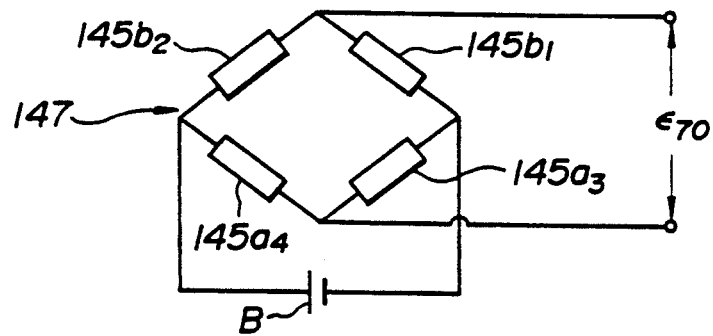

FIGS. 26A and 26B are circuit diagrams of strain value detection circuits respectively. In each of the drawings, the strain gauges shown in FIG. 25 are identified at numerals $145a_1$-$145a_4, 145b_1, 145b_2$ respectively. Numeral 146 indicates a Wheatstone bridge circuit for detecting a strain value $\epsilon_{60}$ corresponding to each angular displacement, while numeral 147 indicates a Wheatstone bridge circuit for detecting a strain value $\epsilon_{70}$ corresponding to a displacement caused by each twisting deformation. The displacement controller for such radial flexible-beam displacement mechanisms $78M_{ya}, 78M_{yb}$ is substantially the same as the displacement controller depicted in FIG. 24. Namely, in the displacement controller shown in FIG. 24, a strain signal generating circuit including the Wheatstone bridge circuit 146 and another strain signal generating circuit including the Wheatstone bridge circuit 147 are provided in place of the strain signal generating circuits 140,141x,141z. Each output signal of the former strain signal generating circuit is input directly to the adders 126a,126b, while each output signal of the latter strain signal generating circuit is input to the adders 126a,126b. The other construction is the same as that of the controller depicted in FIG. 24. Its operation is also similar to the operation of the controller shown in FIG. 24. By the controller, it is possible to perform a displacement control similar to that for a symmetrical radial flexible-beam displacement mechanism.

It is also apparent that capacitance displacement detectors such as those shown in FIGS. 18A-19C may be used in place of the strain gauges in the above radial flexible-beam displacement mechanisms.

Three displacement controllers have been described above. Coupled with the structure of each fine positioning device mentioned above, positioning of high accuracy can be performed by using one of the above-described displacement controllers for each of parallel flexible-beam displacement mechanisms or radial flexible-beam displacement mechanism (hereinafter called "fine motion unit") with respect to a specific axis. Limitations are however imposed on the accuracy of machining or working of each fine motion unit itself and also on the accuracy of machining or working and assembly of attachment portions of each fine motion unit. It is therefore difficult to perform displacements on the order of micrometers with high accuracy by any one of the above-described fine positioning devices which are each composed of plural fine motion units, because such displacements are adversely affected even by slightest interference displacements. This will next be described with reference to FIG. 27.

Figure 27:
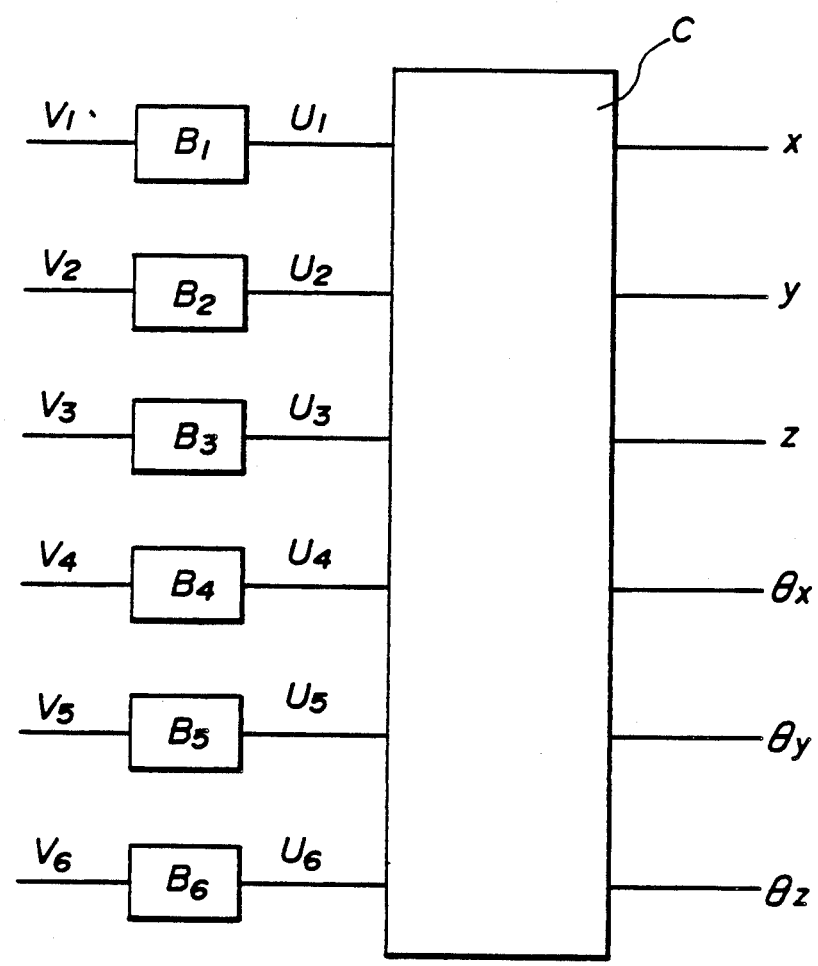
FIG. 27 is a block diagram illustrating characteristics of a 6-axis fine positioning device.

FIG. 27 is a block diagram illustrating characteristics of a fine positioning device depicted for example in FIG. 10. The fine positioning device is constructed in combination of six fine motion units which include three sets of parallel flexible-beam displacement mechanisms for producing translational displacements along the x-, y- and z-axes respectively and three sets of radial flexible-beam displacement mechanisms for producing angular displacements about the x-, y- and z-axes respectively. In FIG. 27, there are shown drive voltages $V_1$-$V_6$ applied to the fine motion units respectively and displacements $U_1$-$U_6$ occurred in the respective fine motion units (fine motion unit displacements) by the corresponding drive voltages $V_1$-$V_6$. Letters x, y, z, $\theta_x$, $\theta_y$ and $\theta_z$ indicate displacement components at a certain specific point (hereinafter called "standard point") on the fine motion table 43 of the fine positioning device depicted in FIG. 10. These displacements and displacement components will hereinafter be called "displacements at the standard point" and "displacement components at the standard point" respectively. Letters $B_1$-$B_6$ indicate the gain characteristics between drive voltages $V_1$-$V_6$ and the displacements $U_1$-$U_6$ of the corresponding fine motion units. Letter C indicates displacement interference characteristics representing the relation between the displacements $U_1$-$U_6$ of the respective fine motion units and the displacement components x, y, ... $\theta_z$ at the standard point.

Let's now assume by way of example that the voltage $V_1$ is applied to a desired fine motion unit (which may be constructed, for example, of the parallel flexible-beam displacement mechanisms $16F_{xa}, 16F_{xb}$ in the case of the fine positioning device depicted in FIG. 10) in order to make the standard point undergo a translational displacement along the x-axis. The fine motion unit then produces a fine motion unit displacement $U_1$. Here, the drive voltages $V_2$-$V_6$ and fine motion unit displacements $U_2$-$U_6$ are all 0. It would be ideal that upon production of the displacement $U_1$ in the fine motion unit, the displacement component x occurs at the standard point and the other displacement components y-$\theta_z$ at the standard point become 0. Due to limitations to the machining accuracy and assembling accuracy as mentioned above, the other displacement components at the standard point are not reduced to 0 although they are small. It is hence unavoidable that certain values are produced with respect to some or all of the other displacement components. In other words, displacement components other than the translational displacement along the x-axis occur.

Where high positioning accuracy on the order of micrometers is required, the above fine positioning device cannot be used as is unless its machining and assembly are achieved with ultimate accuracy. It is however practically impossible to achieve such ultimate accuracy. This is a problem not limited solely to the fine positioning device of FIG. 10 but a problem common to all fine positioning devices composed of plural fine motion units.

Figure 28:
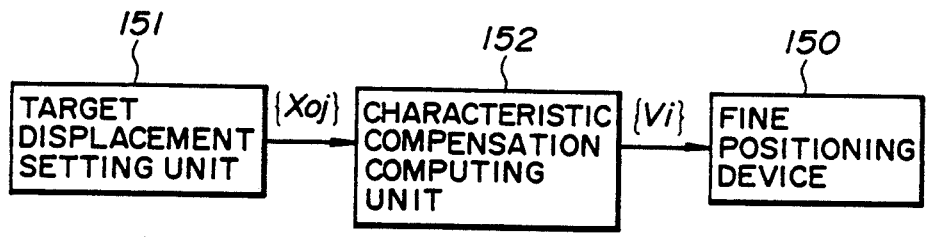
FIGS. 28, 29 and 30 are block diagrams of displacement controllers according to still further embodiments of this invention respectively.

A description will next be made of a still further displacement controller which can solve such a problem. FIG. 28 is a block diagram of a displacement controller for a multi-axis fine positioning device. In the drawing, numeral 150 indicates a fine positioning device composed of plural fine motion units, such as that illustrated in FIG. 10. Designated at numeral 151 is a target displacement setting unit, in which a target value of the standard point of the fine positioning device 150 is set. Numeral 152 indicates a characteristic compensation computing unit 152, which receives a target displacement from the target displacement setting unit 151, performs predetermined computation on the basis of the target displacement, and outputs a drive voltage to each fine motion unit so as to produce the desired displacement at the standard point of the fine positioning device 150.

The computation of the characteristic compensation computing unit 152 will next be described. Let's now assume by way of example that the displacement component x is obtained at the standard point (the other displacement components y-$\theta_z$ being 0). In the characteristics shown in FIG. 27, the desired standard-point displacements (x, 0, 0, ..., 0) cannot be obtained unlike the above-mentioned operation even when the drive voltage $V_1$ is applied to one of the fine motion units and the fine motion unit displacement $U_1$ is produced. In order to obtain such a desired standard-point displacement, it is necessary to produce displacements in the other fine motion units so as to cancel small displacement components occurred respectively in the standard-point displacement components y-$\theta_z$ which are supposed to be 0 in principle. When a target displacement (x, 0, ..., 0) is input to the target displacement setting unit 151, the characteristic compensation computing unit 152 computes how much voltage should be applied to which fine motion unit to produce a fine motion unit displacement.

Let's now assume that in each fine motion unit, a principal displacement U takes place alone and interference displacements, which are displacement components in directions other than the direction of the principal displacement, can be deemed to be 0 practically. The relation between the drive voltages $V_1$-$V_6$ and the fine motion unit displacements $U_1$-$U_6$ can be represented by the following determinant:

$$\begin{pmatrix} U_1 \\ U_2 \\ \cdot \\ \cdot \\ \cdot \\ U_6 \end{pmatrix} = \begin{pmatrix} B_1 & 0 & \ldots & & \ldots & 0 \\ 0 & B_2 & 0 & \ldots & \ldots & 0 \\ \cdot & & & & & \cdot \\ \cdot & & & & B_5 & 0 \\ 0 & 0 & \ldots & 0 & & B_6 \end{pmatrix} \cdot \begin{pmatrix} V_1 \\ V_2 \\ \cdot \\ \cdot \\ \cdot \\ V_6 \end{pmatrix} \quad (1)$$

On the other hand, the relation between the fine motion unit displacements $U_1$-$U_6$ and the standard-point displacements x-$\theta_z$ can be represented by the following determinant:

$$\begin{pmatrix} x \\ y \\ z \\ \theta_x \\ \theta_y \\ \theta_z \end{pmatrix} = \begin{pmatrix} C_{11} & C_{12} & \ldots & C_{16} \\ C_{21} & C_{22} & \ldots & C_{26} \\ \cdot & & & \cdot \\ \cdot & & & \cdot \\ C_{61} & \cdot & \ldots & C_{66} \end{pmatrix} \cdot \begin{pmatrix} U_1 \\ U_2 \\ \cdot \\ \cdot \\ \cdot \\ U_6 \end{pmatrix} \quad (2)$$

In the determinant (2), the 36 constants $C_{11}$-$C_{66}$ can be known by conducting at least 6 times an operation that the respective standard-point displacements x-$\theta_z$ are measured upon production of certain displacements in six fine-motion units respectively, the respective standard-point displacements x-$\theta_z$ are measured upon production of different displacements in the same fine motion units, and then the resulting equation is then solved. Incidentally, the measurement of these standard-point displacement components x-$\theta_z$ can be effected by a sensor provided externally, such as laser displacement sensor.

The individual matrices of the above determinants (1) and (2) are now abbreviated as follows:

$$\begin{pmatrix} U_1 \\ U_2 \\ \cdot \\ \cdot \\ U_6 \end{pmatrix} \text{ as } \{U_i\}$$

$$\begin{pmatrix} B_1 & 0 & \ldots & & 0 \\ 0 & B_2 & \ldots & & 0 \\ \cdot & & & & \\ \cdot & & & B_5 & 0 \\ 0 & 0 & \ldots & 0 & B_6 \end{pmatrix} \text{ as } \{B_i\}$$

$$\begin{pmatrix} V_1 \\ V_2 \\ \cdot \\ \cdot \\ V_6 \end{pmatrix} \text{ as } \{V_i\}$$

$$\begin{pmatrix} x \\ y \\ z \\ \theta_x \\ \theta_y \\ \theta_z \end{pmatrix} \text{ as } \{X_j\}$$

$$\begin{pmatrix} C_{11} & C_{12} & \ldots & C_{16} \\ C_{21} & C_{22} & \ldots & C_{26} \\ \cdot & & & \\ \cdot & & & \\ C_{61} & \cdot & \ldots & C_{66} \end{pmatrix} \text{ as } \{C_{ji}\}$$

Then, the determinant (1) and (2) can be expressed as follows:

$$\{U_i\} = \{B_i\} \cdot \{V_i\} \quad (3)$$

$$\{X_j\} = \{C_{ji}\} \cdot \{U_i\} \quad (4)$$

In the above description, parameters other than those described above may also be expressed in the same manner.

From the foregoing description, it is only necessary for the characteristic compensation computing unit 152 to determine a drive voltage $\{V_i\}$ which can satisfy the following equation. Namely, the drive voltage $\{V_i\}$ and standard-point displacement $\{X_j\}$ are determined.

$$\{X_j\} = \{D_{ji}\} \cdot \{V_i\} \qquad (5)$$

Here, the matrix $\{D_{ji}\}$ in the equation (5) can be determined by the same method as that employed to determine the matrix $\{C_{ji}\}$ in the determinant (2). From the equation (5), the drive voltage $\{V_i\}$ for obtaining the desired standard-point displacement $\{X_j\}$ can be determined by effecting computation in accordance with the following equation.

$$\{V_i\} = \{D_{ji}\}^{-1} \cdot \{X_j\} \qquad (6)$$

Consequently, the characteristic compensation computing unit 152 has as compensation characteristics the inverse characteristics $\{D_{ji}\}$ of the characteristic matrix $\{D_{ji}\}$ determined by the above equation (5). Computation is performed in accordance with these inverse characteristics $\{D_{ji}\}^{-1}$.

The operation of this displacement controller will next be described. When a target displacement (which will be expressed by $\{X_{0j}\}$) of the standard point is set in the target displacement setting unit 151, this target displacement $\{X_{0j}\}$ is input to the characteristic compensation computing unit 152 so that computation is performed in accordance with the above equation (6). This computation apparently results in a solution obtained by substituting the target displacement $\{X_{0j}\}$ to the standard-point displacement $\{X_j\}$ in the equation (6). When a drive voltage $\{V_i\}$ obtained from the above computation is input to a fine positioning device 150, a displacement $\{X_{0j}\}$ occurs at its standard point.

The above operation is now described with reference to the preceding specific embodiment. When x=x, y=0, z=0, $\theta_x=0$, $\theta_y=0$ and $\theta_z=0$ are set in the target displacement setting unit in order to produce a desired translational displacement (x, 0, . . . ,0) at the standard point, these values are input to the characteristic compensation computing unit 152 to perform computation in accordance with the equation (6), namely, $$\begin{pmatrix} V_1 \\ V_2 \\ \cdot \\ \cdot \\ V_6 \end{pmatrix} = \begin{pmatrix} D_{11} & \cdots & D_{16} \\ \cdot & & \cdot \\ \cdot & & \cdot \\ D_{61} & \cdots & D_{66} \end{pmatrix}^{-1} \begin{pmatrix} x \\ 0 \\ 0 \\ 0 \\ 0 \\ 0 \end{pmatrix} \qquad (6')$$

Drive voltages $V_1$–$V_6$ are hence obtained and output. In this case, all the drive voltages $V_2$–$V_6$ are not necessarily 0 as described above. They have values determined by the respective constants of the matrix $\{D_{ji}\}^{-1}$, which are in turn determined by the constants $D_{11}$–$D_{66}$ in the matrix $\{D_{ji}\}$. Plural fine motion units are then driven by the drive voltages $V_1$–$V_6$ output in the manner described above, whereby the target displacement (x, 0, . . . , 0) occurs at the standard point.

The displacement controller shown in FIG. 28 has been described above. In the case of ideal characteristics that each fine motion unit is free of any interference unlike the above-mentioned case, the following equation (7) can be derived from the above-described equations (3) and (4):

$$\{X_j\} = \{C_{ji}\} \cdot \{B_i\} \cdot \{V_i\} \qquad (7)$$

From a comparison of the equation (7) with the equation (5), the following relation can be derived.

$$\{D_{ji}\} = \{C_{ji}\} \cdot \{B_i\}$$

The compensation characteristics $\{D_{ji}\}^{-1}$ of the characteristic compensation computing unit 152 can therefore be obtained as an inverse matrix of the product of the matrices $\{B_i\}$ and $\{C_{ji}\}$. In this case, the fine motion unit displacement $\{U_i\}$ in the equations (3) and (4) is measured by strain gauges provided with each fine motion unit as shown in FIGS. 14A or 22. Needless to say, the measurement is also feasible by a displacement sensor other than strain gauge as described before.

Owing to the above construction, the displacement controller of this embodiment can obtain displacements of extremely high accuracy even if it is manufactured with ordinary machining and assembly accuracy.

Figure 29:
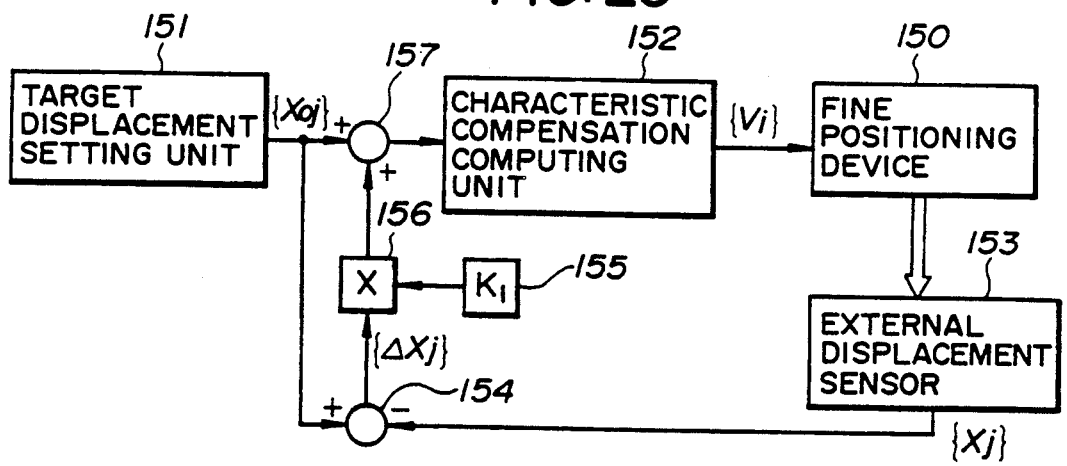

FIG. 29 is a block diagram of a still further displacement controller for a multi-axis fine positioning device, in which elements of structure identical to their corresponding elements shown in FIG. 28 are identified by like reference numerals and letters. Description of these elements is omitted herein. Numeral 153 indicates an external displacement sensor for detecting each displacement of the standard point of the fine positioning device 150. The external displacement sensor 153 outputs an electrical signal proportional to the displacement detected. A laser displacement sensor is generally used as the external displacement sensor. The laser displacement sensor is provided outside the fine positioning device 150 so as to detect any displacement of its standard point. Designated at numeral 154 is a subtractor for computing the difference between each detection output $\{X_j\}$ of the external displacement sensor 153 and the target displacement $\{X_{0j}\}$ set in the target displacement setting unit 151. Numeral 155 indicates a constant generating unit for generating a predetermined constant $K_1$, while numeral 156 designates a multiplying unit for multiplying by the constant $K_1$ each difference $\{\Delta X_j\}$ output from the subtractor 154. Designated at numeral 157 is an adding unit for adding together the target displacement $\{X_{0j}\}$ and each value obtained at the multiplying unit 156. The displacement controller of this embodiment has such a construction that the so-called feedback control is applied to the construction of the displacement controller shown in FIG. 28. The constant $K_1$ is a feedback gain.

The operation of this displacement controller will next be described. When a target displacement $\{X_{0j}\}$ of the standard point is set in the target setting unit 151, a drive voltage $\{V_i\}$ is output from the characteristic compensation computing unit 152 like the preceding embodiment so that the standard point of the fine positioning device 150 undergoes a displacement. This displacement $\{X_j\}$ is detected by the external displacement sensor 153, and its difference $\{\Delta x_j\}$ from the target displacement $\{X_{0j}\}$, i.e., $\{\Delta x_j\} = \{X_{0j}\} - \{X_j\}$ is computed at the subtractor 154. The constant $K_1$ is multiplied to the thus-computed difference $\{\Delta X_j\}$ at the multiplying unit 156. The product $K_1 \cdot \{\Delta x_j\}$ is then input to the adding unit 157, so that the target displacement $\{X_{0j}\}$ is adjusted. This adjusted value is then input to the characteristic compensation computing unit 152 and a new drive voltage $\{V_i\}$ is then output responsive to the adjusted value, whereby the displacement of the standard point of the fine positioning device 150 is adjusted.

Any deviation of the displacement of the standard point relative to the target displacement $\{X_{0j}\}$ is gradually corrected by repeating the above-mentioned series of operations. The standard point is stopped when the displacement has coincided with the target displacement.

In the above description, a proportional control method in which the difference $\{\Delta X_j\}$ is multiplied by the feedback gain $K_1$ is used in order to perform the feedback control effectively. The present invention is however not necessarily limited to the use of such a proportional control method. Needless to say, so-called integral control or differential control may also be used. Therefore, the signal added to the target displacement $\{X_{0j}\}$ at the adding unit 157 may be called in more generic term, i.e., "a signal corresponding to the difference $\{\Delta X_j\}$".

In the displacement controller described above, feedback control in which each displacement of the standard point of the fine positioning device is fed back has been applied to the construction of the preceding embodiment. It is hence possible to perform displacement of the standard point with still higher accuracy. If an error is involved for some reasons in the course of obtaining the compensating characteristics $\{D_{ji}\}^{-1}$ of the characteristic compensation computing unit or drift characteristics and non-linear characteristics are involved in an electric circuit when the compensation characteristics are composed by the electric circuit, the displacement of the standard point may not be achieved fully with desirable accuracy when the construction of the displacement controller shown in FIG. 28 is relied upon. If feedback control is applied as in the present displacement controller, it is however possible to avoid such an error in the compensating characteristics or the influence due to the drift characteristics and non-linear characteristics of the electric circuit, so that highly-accurate positioning can be performed.

Figure 30:
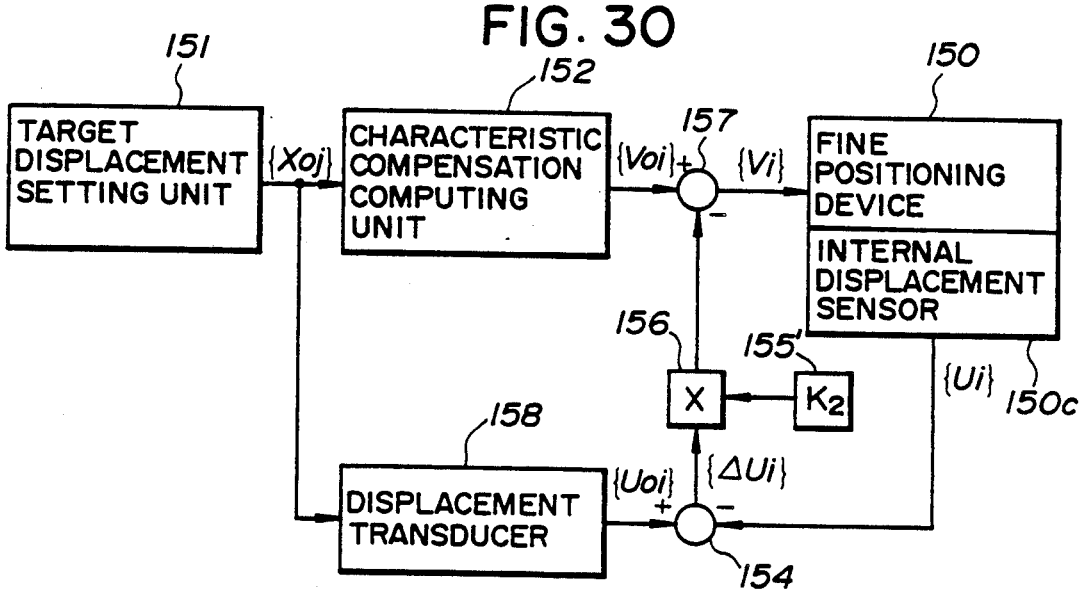

FIG. 30 is a block diagram of a still further displacement controller for a multi-axis fine positioning device. Elements of structure identical to their corresponding elements depicted in FIG. 29 are identified by like reference numerals, and their description is omitted herein. Designated at numeral 150c is an internal displacement sensor typified by strain gauges (see FIGS. 14A and 22) cemented on each fine motion unit or a Wheatstone bridge circuit formed of such strain gauges. The internal displacement sensor 150c output a signal proportional to each displacement $\{U_i\}$ of each fine motion unit. Displacement indicators of other types may also be used obviously. Numeral 155' indicates a constant generating unit for generating a feedback gain $K_2$. Designated at numeral 158 is a displacement transducer for converting a target displacement signal $\{X_{0j}\}$ into its corresponding fine motion unit displacement signal $\{U_{0i}\}$. The present embodiment constitutes a feedback control system as apparent from the drawing.

Here, the above displacement transducer 158 is described in detail. In order to have the displacement transducer 158 produce the displacement $\{X_{0j}\}$ at the standard point of the fine positioning device 150 as described above when the target displacement signal $\{X_{0j}\}$ is input, the displacement transducer 158 has a function that determines how each fine motion unit should be displaced. In order to exhibit this function, characteristics correlating the standard point displacement $\{X_j\}$ with the fine motion unit displacement $\{U_i\}$ are essential. These characteristics are indicated by the displacement interference characteristics $\{C_{ji}\}$ in the equation (4). Thus, the displacement transducer 158 has inverse characteristics $\{C_{ji}\}^{-1}$ of the displacement interference characteristics $\{C_{ji}\}$. By performing computation in accordance the inverse characteristics $\{C_{ji}\}^{-1}$, it is possible to output the fine motion unit displacement signal $\{U_{0i}\}$ *for obtaining the target displacement* $\{X_{0j}\}$.

The operation of the displacement controller will next be described. When the target displacement $\{X_{0j}\}$ is set in the target displacement setting unit 151, the fine motion unit displacement signal $\{X_{0j}\}$ for producing the target displacement $\{X_{0j}\}$ at the standard point of the fine positioning device 150 is computed at the displacement transducer 158 and is then output. When the target displacement $\{X_{0j}\}$ is input to the characteristic compensation computing unit 152, its corresponding drive voltage $\{V_{0i}\}$ is output. This drive voltage $\{V_{0i}\}$ is converted into the drive voltage $\{V_i\}$ by way of the adding unit 157. The drive voltage $\{V_i\}$ is then applied to each fine motion unit of the fine positioning device 150. The parallel and/or radial flexible beams composing each fine motion unit are hence deformed to make the fine motion unit undergo a displacement, whereby the standard point of the fine positioning device 150 is displaced.

When the parallel and/or radial flexible beams are deformed on the other hand, the resistance values of the plural strain gauges cemented there vary responsive to the deformation. These strain gauges are formed into a Wheatstone bride circuit as described above so that a signal proportional to the displacement of the fine motion unit is output from the Wheatstone bridge circuit. Namely, the displacement $\{U_i\}$ of each fine motion unit is output from the internal displacement sensor 150c.

At the subtractor 154, computation is performed to determine the difference $\{\Delta U_i\}$ ($\{\Delta U_i\} = \{U_{0i}\} - \{U_i\}$) between the target fine motion unit displacement signal $\{U_{0i}\}$ output from the displacement transducer 158 and the actual fine motion unit displacement $\{U_i\}$ output from the internal displacement sensor 150c. At the multiplying unit 156, the constant $K_2$ is multiplied to the difference $\{\Delta U_i\}$ computed above. The product, $K_2 \cdot \{\Delta U_i\}$, is then input to the adding unit 157, whereby the drive voltage $\{V_{0i}\}$ of the characteristic compensation computing unit 152 is corrected to output a new drive voltage $\{V_i\}$ so that the displacement of the standard point of the fine positioning device 150 is corrected. By repeating such correction, the deviation of the standard point from the target displacement $\{X_{0j}\}$ is corrected gradually. The standard point is stopped when the displacement has coincided with the target displacement.

Similar to the preceding displacement controller, it is possible to use not only proportional control but also integral control or differential control for the feedback control of the displacement controller of this embodiment. It is also similar to the preceding case that capacitance displacement sensors or over-current displacement sensors may also be used as internal displacement sensors instead of strain gauges.

In the above description, the inverse characteristics $\{C_{ji}\}^{-1}$ of the displacement interference characteristics $\{C_{ji}\}$ are used by way of example for computation at the displacement transducer 158. It is a prerequisite for the use of such inverse characteristics to employ an ideal fine motion unit that undergoes displacements in the direction of its main displacement $U_i$ and does not undergo any displacements in other directions as indicated in FIG. 27 and by the above equation (1), when the drive voltage $\{V_i\}$ is applied to a desired fine motion unit. Such a situation however does not exist practically when observed strictly. When the drive voltage $\{V_i\}$ is applied, it is usual that an interference displacement occurs besides the displacement $\{U_i\}$ in the main direction of displacements although such an interference displacement is small. If such an interference displacement exists, an issue arises whether the conversion at the displacement transducer 158 could be handled solely in relation to the relationship between the fine motion unit displacement $\{U_i\}$ and the standard point displacement $\{X_j\}$, namely, on basis of the inverse characteristics $\{C_{ji}\}^{-1}$ alone of the displacement interference characteristics $\{C_{ji}\}$. All interference displacement components including the above-mentioned new interference component are however contained in the displacement interference characteristics $\{C_{ji}\}$ as defined by the equations (2) and (4), provided that $\{C_{ji}\}$ as defined by the equations (2) and (4) is defined newly as the relation between the fine motion unit displacement $\{U_i\}$ which occurs upon application of the drive voltage $\{V_i\}$ to each of the fine motion units composing an actual fine positioning device, and the standard point displacement $\{X_j\}$. Even if one or more interference displacement components are involved in the fine motion unit displacement $\{U_i\}$, compensating computation can be performed including all interference components provided that a conversion is effected on the basis of the inverse characteristics $\{C_{ji}\}^{-1}$ of $\{C_{ji}\}$, which inverse characteristics have been defined newly at the displacement transducer 158. Needless to say, it is apparent that $\{C_{ji}\}$ according to the new definition is not contradictory at all to $\{C_{ji}\}$ according to the preceding definition.

Owing to the construction described above, the displacement controller of the above embodiment can perform displacements of still higher accuracy. In addition to such an advantage, the displacement controller has remarkable effects as will be described below. Namely, like the displacement controller shown in FIG. 29, laser displacement sensors capable of performing detection on the order of micrometers are used as external displacement sensors for detecting displacements of the standard point of a fine positioning device. However, the mounting and adjustment of these laser displacement sensors are extremely cumbersome. A lot of labor and time are therefore required for their mounting and adjustment and moreover, such laser displacement sensors per se are extremely expensive. The above displacement controller does not use such external displacement sensors but makes use of the internal displacement sensors which the fine positioning device itself has. Therefore, the above displacement controller is extremely simple in structure and can be constructed easily at a low price. These advantageous effects have been brought about for the first time, because owing to the use of parallel flexible-beam displacement mechanisms and/or radial flexible-beam displacement mechanisms as fine motion units, the detection of a displacement of one of fine motion units is not affected at all by the drive of the remaining fine motion units and an independent displacement detection is feasible for each fine motion unit.

Having now fully described the invention, it will be apparent to one of ordinary skill in the art that many changes and modifications can be made without departing from the spirit or scope of the invention as set forth herein.

What is claimed is:

1. A fine positioning device comprising:
   (a) a rigid support member;
   (b) a first set of radial flexible-beam displacement mechanisms provided symmetrically to each other on the support member to produce angular displacements about a first axis;
   (c) a second set of radial flexible-beam displacement mechanisms provided symmetrically to each other on the support member to produce angular displacements about a second axis which is perpendicular to the first axis;
   (d) a third set of radial flexible-beam displacement mechanisms connected to either one of the first and second sets of radial flexible-beam displacement mechanisms to produce angular displacements about a third axis which is perpendicular to both the first and second axes; and
   (e) a fine motion table fixed on the radial flexible-beam displacement mechanisms which are other than those connected to the radial flexible-beam displacement mechanisms for producing angular displacements about the third axis,
   (f) wherein the first, second, and third axes all extend through a predetermined single common point located on or near a surface of the fine motion table.

2. The fine positioning device as claimed in claim 1, wherein each of the first, second and third sets of radial flexible-beam displacement mechanisms undergoes a bending deformation upon application of a moment about its respective angular displacement producing axis and is composed of a plurality of flexible beams extending radially relative to each other with respect to a predetermined point on the respective angular displacement producing axis and an actuator for applying the moment to the flexible beams.

3. The fine positioning device as claimed in claim 2, wherein the actuator is a piezoelectric actuator.

4. The fine positioning device as claimed in claim 1, wherein the radial flexible-beam displacement mechanisms for producing angular displacements about the third axis are provided symmetrically on both sides of a central rigid portion.

5. The fine positioning device as claimed in claim 1, wherein the device further comprises a fine motion table, the radial flexible-beam displacement mechanisms are formed respectively in rigid portions provided on the support member, and the fine motion table is fixed on the rigid portions.

6. The fine positioning device as claimed in claim 1, wherein the support member is constructed in the form of a ring.

* * * * *